United States Patent
Azuma et al.

(10) Patent No.: US 12,344,911 B2
(45) Date of Patent: *Jul. 1, 2025

(54) HIGH-STRENGTH STEEL SHEET AND METHOD FOR MANUFACTURING SAME

(71) Applicant: NIPPON STEEL CORPORATION, Tokyo (JP)

(72) Inventors: Masafumi Azuma, Tokyo (JP); Eisaku Sakurada, Tokyo (JP); Genki Abukawa, Tokyo (JP); Kenichiro Otsuka, Tokyo (JP); Takeshi Toyoda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 968 days.

This patent is subject to a terminal disclaimer.

(21) Appl. No.: 17/430,651

(22) PCT Filed: Mar. 19, 2020

(86) PCT No.: PCT/JP2020/012425
§ 371 (c)(1),
(2) Date: Aug. 12, 2021

(87) PCT Pub. No.: WO2020/196311
PCT Pub. Date: Oct. 1, 2020

(65) Prior Publication Data
US 2022/0186333 A1    Jun. 16, 2022

(30) Foreign Application Priority Data
Mar. 22, 2019    (JP) .................................. 2019-055469

(51) Int. Cl.
*C21D 9/46* (2006.01)
*B21C 47/02* (2006.01)
(Continued)

(52) U.S. Cl.
CPC ............... *C21D 9/46* (2013.01); *B21C 47/02* (2013.01); *C21D 8/0226* (2013.01);
(Continued)

(58) Field of Classification Search
None
See application file for complete search history.

(56) References Cited

U.S. PATENT DOCUMENTS

| | | | |
|---|---|---|---|
| 12,018,344 B2 * | 6/2024 | Azuma | ............... C21D 8/0242 |
| 2012/0031528 A1 * | 2/2012 | Hayashi | ............... C22C 38/001 |
| | | | 148/269 |

(Continued)

FOREIGN PATENT DOCUMENTS

| | | |
|---|---|---|
| CN | 105814227 A | 7/2016 |
| EP | 3 135 788 A1 | 3/2017 |

(Continued)

OTHER PUBLICATIONS

Nippon Steel Corporation, "High-Strength Steel Sheet and Method for Manufacturing Same", Complete Specification for Application No. IN202117036241, 2006, 63 pages total.

Primary Examiner — Brian D Walck
(74) Attorney, Agent, or Firm — Birch, Stewart, Kolasch & Birch, LLP

(57) ABSTRACT

A high-strength steel sheet includes a predetermined chemical composition, a microstructure contains, by volume percentage, 95% or more of tempered martensite and bainite in total, and a remainder consists of ferrite and pearlite, the microstructure contains $5.0\times10^9$ pieces/mm or more of, per unit volume, precipitate having an equivalent circle diameter of 5.0 nm or less and containing Ti, Hvs/Hvc which is a ratio of an average hardness Hvs at a position of a depth of 20 μm from a surface to an average hardness Hvc at a position of 0.20 to 0.50 mm from the surface is 0.85 or more, a tensile (Continued)

strength is 980 MPa or more, and a product of the tensile strength and elongation is 12,000 MPa×% or more.

9 Claims, 9 Drawing Sheets

(51) Int. Cl.
*C21D 8/02* (2006.01)
*C22C 38/00* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/54* (2006.01)
*C23C 2/40* (2006.01)
*C23G 1/00* (2006.01)

(52) U.S. Cl.
CPC .......... *C21D 8/0263* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C23C 2/40* (2013.01); *C23G 1/00* (2013.01); *C21D 2211/002* (2013.01); *C21D 2211/005* (2013.01); *C21D 2211/008* (2013.01); *C21D 2211/009* (2013.01)

(56) References Cited

U.S. PATENT DOCUMENTS

| | | | |
|---|---|---|---|
| 2016/0273066 A1* | 9/2016 | Sakakibara | ............... C23C 2/06 |
| 2016/0319385 A1 | 11/2016 | Hasegawa et al. | |
| 2018/0237874 A1* | 8/2018 | Yamazaki | ............... C22C 38/24 |
| 2019/0309398 A1 | 10/2019 | Sano et al. | |

FOREIGN PATENT DOCUMENTS

| | | |
|---|---|---|
| JP | 2015-147958 A | 8/2015 |
| WO | WO2010/137317 A1 | 12/2010 |
| WO | WO2018/026013 A1 | 2/2018 |

* cited by examiner

HIGH-STRENGTH STEEL SHEET AND METHOD FOR MANUFACTURING SAME

TECHNICAL FIELD OF THE INVENTION

The present invention relates to a high-strength steel sheet and a method for manufacturing the same.

Priority is claimed on Japanese Patent Application No. 2019-055469, filed Mar. 22, 2019, the content of which is incorporated herein by reference.

RELATED ART

In recent years, in order to protect the global environment, the fuel efficiency of vehicles has needed to be improved. Regarding the improvement of fuel efficiency of vehicles, high-strength steel sheets are being utilized as steel sheets used for vehicle components (steel sheets for vehicles), in order to reduce the weight of a vehicle body while ensuring collision resistance, and the high-strength steel sheets are also being developed for undercarriage compartments. It is necessary for the steel sheets applied to undercarriage compartments of vehicles to have excellent fatigue resistance, in addition to high tensile strength, high proof stress (high YP), and high ductility.

For example, Patent Documents 1 and 2 disclose steel sheets which are highly strengthened by annealing a hot-rolled steel sheet and performing skin pass rolling before and after the annealing. In addition, Patent Documents 1 and 2 disclose that these steel sheets are excellent in fatigue resistance.

However, the high-strength steel sheet disclosed in Patent Document 1 does not have a tensile strength of 980 MPa or more. In addition, although the high-strength steel sheet disclosed in Patent Document 2 can ensure a tensile strength of 980 MPa or more, it is necessary to improve ductility (particularly elongation), in order to further expand application to undercarriage compartments.

As described above, in the related art, a steel sheet having high tensile strength of 980 MPa or more, high proof stress, high ductility, and excellent fatigue resistance has not been proposed.

PRIOR ART DOCUMENT

Patent Document

[Patent Document 1] PCT International Publication No. WO 2018/026013
[Patent Document 2] PCT International Publication No. WO 2010/137317

DISCLOSURE OF THE INVENTION

Problems to be Solved by the Invention

The present invention has been made in view of the above problems. An object of the present invention is to provide a high-strength steel sheet having high proof stress, high ductility, and excellent fatigue resistance and having tensile strength of 980 MPa or more, suitable for undercarriage compartments of vehicles, and a method for manufacturing the same.

Means for Solving the Problem

The present inventors have intensively studied a method for solving the above problems. As a result, it is found that, in a steel sheet having a predetermined chemical composition, a microstructure is set as a structure containing 95% or more of tempered martensite and bainite in total, the microstructure contains $5.0 \times 10^9$ pieces/mm$^3$ or more of precipitate, per unit volume, containing Ti and having an equivalent circle diameter of 5.0 nm or less, and Hvs/Hvc which is a ratio of an average hardness Hvs at a position of a depth of 20 μm from a surface to an average hardness Hvc at a position of 0.20 to 0.50 mm from the surface is 0.85 or more, and accordingly, a steel sheet having high proof stress, high ductility (high elongation), and excellent fatigue resistance, tensile strength of 980 MPa or more, and a product (TS×El) of tensile strength and ductility (elongation) of 12,000 MPa×% or more can be manufactured.

In addition, the inventors found that in order to obtain such a steel sheet it is effective that a slab to be subjected to hot rolling is heated to 1,230° C. or higher to dissolve Ti or Nb contained in a large amount, a coiling temperature after the hot rolling is set to 300° C. or higher and 600° C. or lower to obtain a mixed structure of martensite and bainite, precipitation of precipitate during the coiling after the hot rolling is suppressed, and the hot-rolled steel sheet after the coiling is lightly reduced to introduce dislocation, the dislocation is set as a nucleation site of the precipitate of Ti or Nb, and a heat treatment is performed in a temperature range of 450° C. to Ac1° C. for a short period of time, and thereby precipitate containing fine Ti is precipitated by a predetermined amount or more.

The present invention has been made based on the above findings, and a gist thereof is as below.

(1) A high-strength steel sheet according to one aspect of the present invention, including, as a chemical composition, by mass %: C: 0.020 to 0.090%; Si: 0.01 to 2.00%; Mn: 1.00 to 3.00%; Ti: 0.010 to 0.200%; Al: 0.005 to 1.000%; P: 0.100% or less; S: 0.0100% or less; N: 0.0100% or less; Ni: 0 to 2.00%; Cu: 0 to 2.00%; Cr: 0 to 2.00%; Mo: 0 to 2.00%; Nb: 0 to 0.100%; V: 0 to 0.100%; W: 0 to 0.100%; B: 0 to 0.0100%; REM: 0 to 0.0300%; Ca: 0 to 0.0300%; Mg: 0 to 0.0300%; and a remainder of Fe and impurities, in which 0.100≤Ti+Nb+V≤0.450 is satisfied, a microstructure contains, by volume percentage, 95% or more of tempered martensite and bainite in total, and a remainder consists of ferrite and pearlite, the microstructure contains $5.0 \times 10^9$ pieces/mm$^3$ or more of, per unit volume, precipitate having an equivalent circle diameter of 5.0 nm or less and containing Ti, Hvs/Hvc which is a ratio of an average hardness Hvs at a position of a depth of 20 μm from a surface to an average hardness Hvc at a position of 0.20 to 0.50 mm from the surface is 0.85 or more, a tensile strength is 980 MPa or more, and a product of the tensile strength and elongation is 12,000 MPa×% or more.

(2) The high-strength steel sheet according to (1), may include, as the chemical composition, by mass %, at least one or two or more selected from the group consisting of: Ni: 0.01 to 2.00%; Cu: 0.01 to 2.00%; Cr: 0.01 to 2.00%; Mo: 0.01 to 2.00%; Nb: 0.005 to 0.100%; V: 0.005 to 0.100%; W: 0.005 to 0.100%; B: 0.0005 to 0.0100%; REM: 0.0003 to 0.0300%; Ca: 0.0003 to 0.0300%; and Mg: 0.0003 to 0.0300%.

(3) The high-strength steel sheet according to (1) or (2) may include a hot-dip galvanized layer on the surface.

(4) In the high-strength steel sheet according to (3), the hot-dip galvanized layer may be a hot-dip galvannealed layer.

(5) A method for manufacturing the high-strength steel sheet according to another aspect of the present invention is a method for manufacturing the high-strength steel sheet according to (1) or (2), the method including: a heating step of heating a slab including, as a chemical composition, by mass %: C: 0.020 to 0.090%; Si: 0.01 to 2.00%; Mn: 1.00 to 3.00%; Ti: 0.010 to 0.200%; Al: 0.005 to 1.000%; P: 0.100% or less; S: 0.0100% or less; N: 0.0100% or less; Ni: 0 to 2.00%; Cu: 0 to 2.00%; Cr: 0 to 2.00%; Mo: 0 to 2.00%; Nb: 0 to 0.100%; V: 0 to 0.100%; W: 0 to 0.100%; B: 0 to 0.0100%; REM: 0 to 0.0300%; Ca: 0 to 0.0300%; Mg: 0 to 0.0300%; and a remainder of Fe and impurities, to 1,230° C. or higher; a hot rolling step of performing hot rolling with respect to the slab such that a finish rolling temperature is 930° C. or higher to obtain a hot-rolled steel sheet; a coiling step of coiling the hot-rolled steel sheet at 300° C. or higher and 600° C. or lower and then cooling the hot-rolled steel sheet to room temperature; a pickling step of pickling the hot-rolled steel sheet after the coiling step; a light reduction step of performing light reduction with respect to the hot-rolled steel sheet after the pickling step at rolling reduction higher than 5% and 30% or less; and a reheating step of reheating the hot-rolled steel sheet after the light reduction step in a temperature range of 450° C. to Ac1° C. and holding for 10 to 1,500 seconds.

(6) The method for manufacturing a high-strength steel sheet according to (5) may further include a plating step of hot-dip galvanizing the hot-rolled steel sheet after the reheating step.

(7) The method for manufacturing a high-strength steel sheet according to (6) may further include a galvannealing step of performing galvannealing by heating the hot-rolled steel sheet after the hot-dip galvanizing step to 460° C. to 600° C.

Effects of the Invention

According to the above aspects of the present invention, it is possible to provide a high-strength steel sheet having a tensile strength of 980 MPa or more, which has high proof stress, high ductility, and excellent fatigue resistance. This steel sheet has great industrial value, because it contributes to weight reduction of vehicle components. In addition, this steel sheet is suitable for undercarriage compartments of vehicles, since it has high strength (high tensile strength), high proof stress, high ductility, and excellent fatigue resistance.

The high-strength steel sheet of the present invention includes a plated steel sheet such as a high-strength hot-dip galvanized steel sheet and a high-strength galvanized steel sheet including a galvanized layer on a surface.

EMBODIMENTS OF THE INVENTION

Figure 1A:
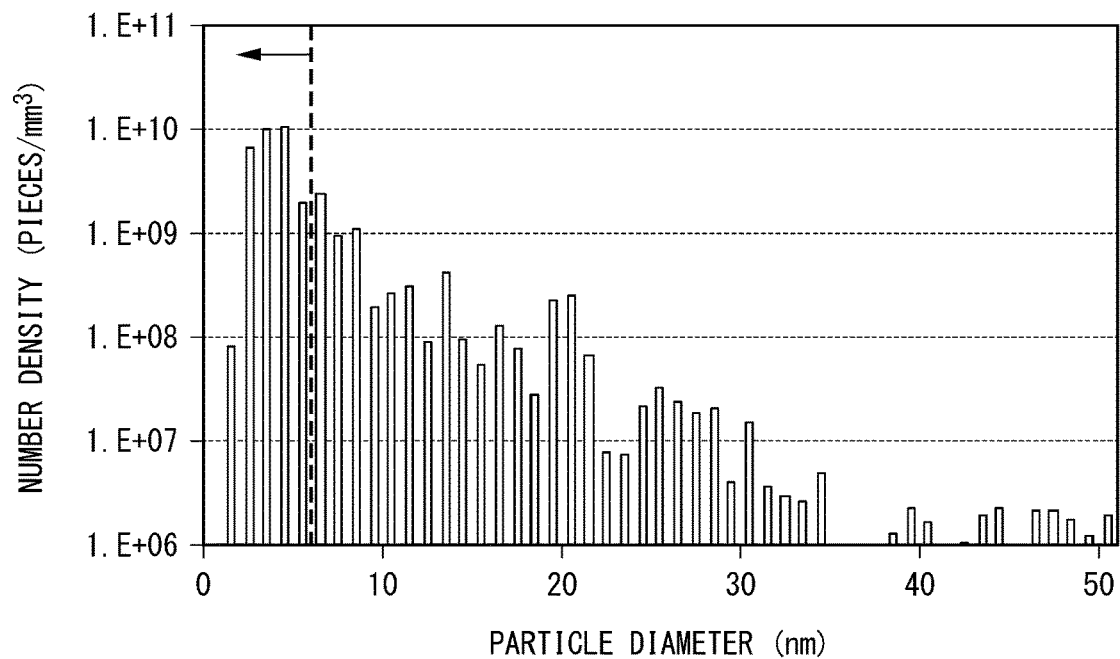
FIG. 1A is a diagram showing the number density of precipitate containing Ti of a steel of the present invention in each particle diameter.

A high-strength steel sheet according to one embodiment of the present invention (hereinafter, steel sheet according to the present embodiment) includes a predetermined chemical composition, a microstructure contains 95% or more of tempered martensite and bainite in total, a remainder consists of ferrite and pearlite, the microstructure contains $5.0 \times 10^9$ pieces/mm$^3$ or more of, per unit volume, precipitate having an equivalent circle diameter of 5.0 nm or less and containing Ti, and Hvs/Hvc which is a ratio of an average hardness Hvs at a position of a depth of 20 μm from a surface to an average hardness Hvc at a position of 0.20 to 0.50 mm from the surface is 0.85 or more. In addition, the steel sheet according to the present embodiment has a tensile strength of 980 MPa or more, and a product of tensile strength and elongation of 12,000 MPa×% or more.

In the steel sheet according to the present embodiment, high strength, high ductility, high proof stress satisfying YP/TS≥0.90, and excellent fatigue resistance satisfying fatigue limit/TS≥0.40 or more are obtained. In addition, a hole expansion ratio of 40% or more can be ensured.

Hereinafter, the steel sheet according to the present embodiment will be described in detail.

<Microstructure Contains 95% or More of Tempered Martensite and Bainite in Total by Volume Percentage, and the Remainder Consists of Ferrite and Pearlite>

First, reasons for limiting the microstructure will be described.

In the steel sheet according to the present embodiment, primary phases of the microstructure are 95% or more of tempered martensite and bainite in total by volume percentage.

As will be described later, the steel sheet according to the present embodiment is controlled so that the precipitate, having an equivalent circle diameter of 5.0 nm or less and containing Ti, has a number density of $5.0 \times 10^9$ pieces/mm$^3$ or more, by using hot rolling, subsequent dislocation introduction under light reduction and heat treatment. Accordingly, it is necessary to set the primary phases of the microstructure before the heat treatment, as martensite or bainite containing many dislocations as precipitation sites of precipitate during the heat treatment. By performing the heat treatment with respect to the martensite or the bainite containing many dislocations, tempered martensite and/or bainite containing fine precipitate becomes the primary phase. In addition, the dislocations in the martensite and the bainite existing before the heat treatment or the dislocation introduced during processing are recovered and rearranged by the heat treatment. Accordingly, the heat treatment also causes the improvement of ductility. In particular, since the bainite has a higher elongation than the martensite, it is preferable to set the volume percentage of the bainite to 50% or more, when particularly excellent ductility is required.

In addition, since ferrite and pearlite are formed at a high temperature, in a case where these structures are formed, precipitate containing Ti precipitated therein also tends to coarsen. In this case, it is not possible to ensure $5.0 \times 10^9$ pieces/mm$^3$ or more of the precipitate containing Ti and having an equivalent circle diameter of 5.0 nm or less. This also implies that, it is necessary that the microstructure contains, by volume percentage, 95% or more of tempered martensite and/or bainite in total, and the remainder is 5% or less. In the present embodiment, the tempered martensite means martensite containing precipitate containing cementite and/or Ti.

For the microstructure, the steel sheet is cut out in parallel to a rolling direction, polished and etched with a nital reagent so that a sheet thickness direction is an observed section, and then a ¼ position of the sheet thickness from the surface in the sheet thickness direction is observed using a SEM at magnification of 1,000 to 30,000 times. Accordingly, ferrite, bainite, pearlite, and martensite can be identified. That is, the determination can be performed based on microstructural morphology, such that, the ferrite is an equiaxed grain that does not contain iron-based carbides, the pearlite is a layered structure of ferrite and cementite, and the bainite is a lath-shaped structure and is a structure containing cementite or residual austenite between laths. An area ratio of each structure identified from the SEM observation image is obtained, and this is defined as the volume percentage. Each volume percentage is obtained by observing 5 or more viewing fields (for example, 5 to 10 viewing fields) at the above magnification and averaging the fractions of each structure obtained in each viewing field.

The martensite includes both tempered martensites containing carbide in lath and as quenched martensite not containing carbide (fresh martensite), and these are observed with an SEM and a TEM, and the presence or absence of carbide can be confirmed and identified. In general, the tempered martensite often refers to those containing iron-based carbides such as cementite, but in the present embodiment, the martensite containing fine precipitate containing Ti is also defined as the tempered martensite.

<Microstructure Contains, Per Unit Volume, $5.0 \times 10^9$ Pieces/Mm$^3$ or More of the Precipitate Containing Ti and Having an Equivalent Circle Diameter of 5.0 nm or Less>

Next, a reason why the present inventors focused on the size and the number density of the precipitate will be described. The present inventors conducted intensive studies about a relationship between the size and the number density of precipitate in which a tensile strength of 980 MPa or more can be ensured. As a result, it was found that, the size (equivalent circle diameter) of the precipitate contained in the hot-rolled steel sheet of the related art and steel sheets in Patent Documents 1 and 2 could not be controlled to 5.0 nm or less, and the number density was also small. As a result of further studies by the present inventors, it is found that, the reason of this is that, the number density of the precipitate having an equivalent circle diameter of 5.0 nm or less is less than $5.0 \times 10^9$ pieces/mm$^3$ in Patent Documents 1 and 2, since, the amount of Ti and the like forming the precipitate is small or it exists as coarse precipitate at a stage of the slab and is not dissolved even during the slab heating even when the Ti and the like are contained, and the TiC precipitated in the heat treatment during a long period of time such as coiling after hot rolling are coarsened.

In the steel sheet according to the present embodiment, by setting the tempered martensite containing precipitate containing Ti and having an equivalent circle diameter of 5.0 nm or less in a number density of $5.0 \times 10^9$ pieces/mm$^3$ or more as a primary phase, the tensile strength of 980 MPa or more can be ensured and the fatigue resistance is also excellent.

The reasons for limiting the size and number density of the precipitate will be described.

The number density, per unit volume, of the precipitate containing Ti and having an equivalent circle diameter of 5.0 nm or less is set to $5.0 \times 10^9$ pieces/mm$^3$ or more, in order to ensure the tensile strength of 980 MPa or more. In a case where the number density is less than $5.0 \times 10^9$ pieces/mm$^3$, it is difficult to ensure the tensile strength of 980 MPa or more. Therefore, it is necessary that the number density of the precipitate containing Ti and having an equivalent circle diameter of 5.0 nm or less is $5.0 \times 10^9$ pieces/mm$^3$ or more.

The precipitate is set as the precipitate containing Ti, since a large amount of the precipitate containing Ti is easily dissolved in the heating stage of the slab before hot rolling, and the precipitate is precipitated as a fine precipitate having an equivalent circle diameter of 5.0 nm or less. 5.0 nm here is the equivalent circle diameter. The type of precipitate such as carbide, nitride, carbonitride, and the like is not limited, and particularly, the carbide is preferable, since the carbide is precipitated as a fine precipitate having a diameter of 5.0 nm or less and contributes to improvement of strength. The precipitate of Ti is mainly contained in the tempered martensite and bainite, which is the primary phase.

Although Nb has an effect similar to that of Ti, the amount of Nb carbide Nb that can be dissolved in the heating stage of the slab is small, and even in a case where Nb is contained alone, the tensile strength of 980 MPa or more cannot be ensured. In addition, although V can be dissolved in a large amount in the heating stage of the slab, the size of the precipitate is relatively large, and even in a case where V is contained alone, it is difficult to ensure $5.0 \times 10^9$ pieces/mm$^3$ or more of the precipitate having a diameter of 5.0 nm or less. Accordingly, it is necessary to use the precipitate containing Ti. However, as long as $5.0 \times 10^9$ pieces/mm$^3$ or more of the precipitate having a diameter of 5.0 nm or less can be ensured, a composite precipitate ((Ti, Nb, V) C, and the like) having a structure in which a part of Ti is substituted with Nb, V, and/or Mo may be used.

The reason why the size of the precipitate is controlled to 5.0 nm or less in terms of the equivalent circle diameter together with the number density described above is to ensure the tensile strength of 980 MPa or more. For the precipitate having an equivalent circle diameter more than 5.0 nm, the number density cannot be set to $5.0 \times 10^9$ pieces/mm$^3$ or more, and the tensile strength of 980 MPa or more cannot be ensured.

The equivalent circle diameter is a value in a case where observed shape of the precipitate is assumed to be a circle, and converted into a diameter of a circle whose area is equivalent. Specifically, the precipitate of Ti may have a plate shape or needle shape, in addition to the spherical shape. However, the area of the observed precipitate is measured, the precipitate is assumed to be a circle, and a value converted into a diameter of the circle whose area is equivalent is defined as the equivalent circle diameter.

The steel sheet according to the present embodiment ensures the strength of the steel sheet by utilizing precipitation hardening. Accordingly, the softening in a heat-affected zone, which has been a problem during welding such as arc welding, can be suppressed, and the fatigue strength of the weld is also excellent. In addition, the steel sheet according to the present embodiment has increased strength due to the precipitate containing Ti and having an equivalent circle diameter of 5.0 nm or less. In such a case, a yield ratio (=YP/TS), which is a ratio of yield stress (YP) to tensile strength (TS), is extremely high at 0.90 or more. By using the steel sheet according to the present embodiment having a high yield ratio, it is possible to provide undercarriage compartments for vehicles that are not easily deformed during riding on a curb or colliding.

Regarding the number density of the precipitate containing Ti, the number density, per equivalent circle diameter at a pitch of 1.0 nm, of the precipitate contained per unit volume of the steel sheet (for example, the number density of equivalent circle diameter more than 0 nm and 1.0 nm or less, the number density of equivalent circle diameter more than 1.0 nm and 2.0 nm or less, the number density of equivalent circle diameter more than 2.0 nm and 3.0 nm or less, and the like) is measured using an electrolytic extraction residual method. The number density of the precipitate is desirably measured at a thickness position of 0.20 mm to ⅜ in a depth direction from the surface where a typical structure of the steel sheet is obtained, for example, the position in the vicinity of ¼ of the sheet thickness from the surface. The sheet thickness center is not preferable as a measurement position, because coarse carbides may be present due to the influence of center segregation and a local chemical composition differs due to the influence of segregation. The position less than 0.20 mm in the depth direction from the surface is not preferable as the measurement position, because it is affected by high-density dislocation introduced under light reduction or decarburization during the heating, and the number density of carbides may differ from the inside.

In the measurement, composition analysis of a carbide is performed with a transmission electron microscope (TEM) and an EDS, and it may be confirmed that fine precipitate is the precipitate containing Ti. Specifically, the steel sheet is polished from the surface to a ¼ position of the sheet thickness, about 1 g of the steel sheet is dissolved according to the electrolytic extraction residual method, the obtained solution containing Ti precipitate is filtered with a filter paper, and the obtained precipitate is attached to C replica and observed with the TEM. In the observation, the magnification is set to 50,000 to 100,000 times, the viewing field is set to 20 to 30, and the chemical composition of the obtained precipitate is specified with the EDS. Then, the image obtained by the TEM observation is subjected to image analysis, and the equivalent circle diameter and the number density of each precipitate are calculated.

The lower limit of the size of the precipitate which is a measurement target is not particularly determined, and the effect can be obtained by setting the number density of the precipitate having an equivalent circle diameter of 5.0 nm or less to $5.0 \times 10^9$ pieces/mm$^3$ or more per unit volume. However, in the hot-rolled steel sheet according to the present embodiment, since it is considered that the amount of the precipitate having an equivalent circle diameter less than 0.4 nm is small, the precipitate having an equivalent circle diameter of 0.4 nm or more may be set as a substantial target.

<Ratio Hvs/Hvc of Average Hardness Hvs at Position of Depth of 20 μm from Surface to Average Hardness Hvc at Position of 0.20 to 0.50 mm from the Surface is 0.85 or More>

In the steel sheet according to the present embodiment, it is necessary to set Hvs/Hvc which is a ratio of an average hardness Hvs at a position of a depth of 20 pam from a surface to an average hardness Hvc at a position of 0.20 to 0.50 mm from the surface (in the sheet thickness direction, range from the position of 0.20 mm from the surface to the position of 0.50 mm from the surface) to 0.85 or more.

The ratio Hvs/Hvc of the average hardness Hvs at the position of 20 μm in the sheet thickness direction from the surface to the average hardness Hvc at the position of 0.20 to 0.50 mm in the sheet thickness direction from the surface is set to 0.85 or more, in order to increase the Hvs/Hvc and largely improve fatigue resistance.

In general, fatigue fracture occurs from the surface. Accordingly, it is effective to harden a surface layer, in order to suppress occurrence of fatigue crack. Meanwhile, the hot-rolled steel sheet is exposed to an oxidizing atmosphere during slab heating and hot rolling. Accordingly, decarburization and the like easily occur and the surface layer hardness is easily reduced. In a case where the surface layer hardness is reduced, the fatigue resistance is also deteriorated.

As a result of intensive studies by the present inventors, it is found that, by combining the light reduction and subsequent heat treatment, the surface layer can be preferentially hardened, thereby improving fatigue resistance.

The hardness at the position of 20 μm in the depth direction from the surface (sheet thickness direction) is defined as the hardness of the surface layer, because the fatigue resistance can be improved by increasing the hardness at this position. In addition, it is because, it is difficult to measure the hardness at a position less than 20 μm from the surface, because it is affected by the surface, and on the other hand, the increase in hardness at the position inside the steel sheet than at the position 20 μm from the surface has slight correlation with the fatigue resistance.

The average hardness Hvc at the position of 0.20 to 0.50 mm from the surface is set as the average hardness in this range. The hardness of the sheet thickness center may not be stable due to the influence of segregation such as Mn. Therefore, it is desirable to avoid the measurement of the hardness of the sheet thickness center, that is, a segregation portion.

The reason why Hvs/Hvc is set to 0.85 or more is that a great effect of improving the fatigue resistance is exhibited by setting the hardness ratio (Hvs/Hvc) to 0.85 or more.

Since this effect is more greatly exhibited at 0.87 or more, it is preferably 0.87 or more. It is more preferably 0.90 or more.

The average hardness Hvs at the position of a depth of 20 μm from the surface and the average hardness Hvc at the position of 0.20 to 0.50 mm from the surface are obtained by the following method.

For the average hardness Hvs at the position of a depth of 20 μm from the surface, a sample is cut out from the ¼ position in the width direction of the steel sheet so that a cross section parallel to the rolling direction is a measurement surface, embedding polishing is performed, a Vickers hardness at the position of 20 μm from the surface is measured at 10 points with a load of 10 gf based on JIS Z 2244: 2009, and an average value thereof is set as Hvs. For the Hvc, a sample is cut out from the ¼ position in the width direction of the steel sheet so that a cross section parallel to the rolling direction is a measurement surface, embedding polishing is performed, a Vickers hardness at a pitch of about 0.05 mm in the sheet thickness direction from the position of 0.20 to 0.50 mm from the surface is measured at 7 points with a load of 10 gf (for example, measured at the positions of 0.20 mm, 0.25 mm, 0.30 mm, 0.35 mm, 0.40 mm, 0.45 mm, and 0.50 mm from the surface), and an average value thereof is set as Hvc.

<Tensile Strength of 980 MPa or More>
<Product of Tensile Strength and Elongation is 12.000 MPa×% or More>

From a viewpoint of improving the fuel efficiency of vehicles by applying the steel sheet to the undercarriage compartments, in the steel sheet according to the present embodiment, a tensile strength is 980 MPa or more and a product of tensile strength and elongation is 12,000 MPa×% or more.

It is not necessary to limit the upper limit of the tensile strength, but the tensile strength may be less than 1,180 MPa, in order to ensure the elongation at a certain level or more. The tensile strength may be 1,179 MPa or less, or 1,170 MPa or less.

The sheet thickness of the steel sheet according to the present embodiment is not particularly limited, but is, for example, 1.0 to 4.0 mm, in consideration of manufacturing stability and the like. It is preferably 1.5 to 3.0 mm.

Next, the reason for limiting the chemical composition of the steel sheet according to the present embodiment will be described. % of the content indicates mass %.

C: 0.020 to 0.090%

C is an element effective for increasing the strength of the steel sheet. In addition, C is an element that forms carbide containing Ti. In a case where the C content is less than 0.020%, it is not possible to ensure the number density of the carbide of $5.0 \times 10^9$ pieces/mm³ or more. Therefore, the C content is set to 0.020% or more.

On the other hand, in a case where the C content exceeds 0.090%, not only the effect is saturated, but also the carbide is difficult to be dissolved during the slab heating. Therefore, the C content is set to 0.090% or less. It is preferably 0.080% or less.

Si: 0.01 to 2.00%

Si is an element that contributes to high-strengthening of a steel sheet by solid solution strengthening. Therefore, the Si content is set to 0.01% or more.

On the other hand, in a case where the Si content exceeds 2.00%, not only the effect is saturated, but also strong scale is generated on the hot-rolled steel sheet, and the external appearance and pickling property are deteriorated. Therefore, the Si content is set to 2.00% or less.

Mn: 1.00 to 3.00%

Mn is an element effective for increasing the volume percentage of martensite and bainite in the microstructure of the steel sheet and increasing the strength of the steel sheet. In order to set the total volume percentage of martensite and bainite to 95% or more, the Mn content is set to 1.00% or more. In a case where the Mn content is less than 1.00%, the volume percentage of martensite and bainite decreases, and sufficient strengthening cannot be performed.

On the other hand, in a case where the Mn content exceeds 3.00%, the effect is saturated and the economic efficiency is lowered. Therefore, the Mn content is set to 3.00% or less. The Mn content is preferably 2.65% or less, and more preferably 2.30% or less.

Al: 0.005 to 1.000%

Al is an element effective for microstructure control by hot rolling and deoxidation. In order to obtain these effects, the Al content is set to 0.005% or more. In a case where the Al content is less than 0.005%, a sufficient deoxidation effect cannot be obtained, and a large amount of inclusions (oxide) is formed in the steel sheet.

On the other hand, in a case where the Al content exceeds 1.000%, the slab is embrittled, which is not preferable. Therefore, the Al content is set to 1.000% or less.

Ti; 0.010 to 0.200%
Nb: 0 to 0.100%
V: 0 to 0.100%
0.100≤Ti+Nb+V≤0.450 (Ti, Nb, and V represent the Ti content, the Nb content, the V content in mass %, respectively) Ti, Nb, and V are elements that form precipitates (carbide, nitride, carbonitride, and the like) by bonding with C or N, and contribute to improvement of steel sheet strength through precipitation hardening by these precipitates. In order to obtain $5.0 \times 10^9$ pieces/mm³ or more of fine precipitate containing Ti and having a equivalent circle diameter of 5.0 nm or less through the manufacturing method which will be described later, the total amount of Ti, Nb, and V (Ti+Nb+V) is set to 0.100% or more, while setting the Ti content to 0.010% or more. The total amount of Ti, Nb, and V is desirably 0.105% or more, and more desirably 0.110% or more.

On the other hand, in a case where the total amount of Ti, Nb, and V (Ti+Nb+V) exceeds 0.450%, these precipitates are excessively precipitated on the slab or the hot-rolled sheet, causing embrittlement, resulting in poor manufacturability. Therefore, the total amount of Ti, Nb, and V is set to 0.450% or less.

In addition, the upper limit of the Ti content is set to 0.200%, the upper limit of the Nb content is set to 0.100%, and the upper limit of the V content is set to 0.100%, because, in a case where the contents thereof exceed these upper limits, it is difficult to dissolve the coarse precipitates precipitated at a casting stage, even in a case where a lower limit of a slab heating temperature is set to 1,230° C. or higher. Further, the excessive amount of Ti, Nb, and V causes embrittlement of the slab and the steel sheet. Therefore, it is desirable that the Ti content has an upper limit of 0.200%, the Nb content has an upper limit of 0.100%, and the V content has an upper limit of 0.100%.

Any combination of Ti, Nb, and V may be used for ensuring $5.0 \times 10^9$ pieces/mm³ or more of fine carbide containing Ti and having an equivalent circle diameter of 5.0 nm or less, however, in order to dissolve the carbide during the heating of the hot-rolled slab, the amount of Ti, which is easy to contain in large amounts and is inexpensive, is at least 0.010% or more.

P: 0.100% or Less

P is an element that segregates in a sheet thickness center portion of the steel sheet and is also an element that embrittles the weld. In a case where the P content exceeds 0.100%, the characteristics are greatly deteriorated. Therefore, the P content is set to 0.100% or less. It is preferably 0.050%® or less. It is preferable that the P content is low, and the effect is exhibited without particularly determining the lower limit (may be 0%), but reducing the P content to less than 0.001% is economically disadvantageous. Therefore, the lower limit of the P content may be 0.001%.

S: 0.0100% or Less

S is an element that causes slab embrittlement by being present as a sulfide. In addition, S is an element that deteriorates formability of the steel sheet. Therefore, the S content is limited. In a case where the S content exceeds 0.0100%, the characteristics are greatly deteriorated. Therefore, the S content is set to 0.0100% or less. On the other hand, the effect is exhibited without particularly determining the lower limit (may be 0% Q), but reducing the S content to less than 0.0001% is economically disadvantageous. Therefore, the lower limit of the S content may be 0.0001%.

N: 0.0100% or Less

N is an element that forms coarse nitride and deteriorates bendability and hole expansibility. In a case where the N content exceeds 0.0100%, the bendability and the hole expansibility are greatly deteriorated. Therefore, the N content is set to 0.0100% or less. In addition, N becomes coarse TiN by bonding with Ti, and in a case where a large amount of N is contained, the number density of precipitate containing Ti and having an equivalent circle diameter of 5.0 nm or less is less than $5.0 \times 10^9$ pieces/mm$^3$. Therefore, it is preferable that the N content is low.

On the other hand, it is not necessary to particularly determine the lower limit of the N content (may be 0%), but in a case where the N content is reduced to less than 0.0001%, the manufacturing cost increases greatly. Therefore, the substantial lower limit of the N content is 0.0001%. From a viewpoint of manufacturing cost, the N content may be 0.0005% or more.

The above elements are the basic chemical composition of the steel sheet according to the present embodiment, the chemical composition of the steel sheet according to the present embodiment contains the above elements, the remainder may consist of Fe and impurities. However, for the purpose of improving various properties, the following compositions can be further contained. Since the following elements do not necessarily have to be contained, the lower limit of the amount thereof is 0%.

Ni: 0 to 2.00%

Cu: 0 to 2.00%

Cr: 0 to 2.00%

Mo: 0 to 2.00%

Ni, Cu, Cr, and Mo are elements that contribute to the high-strengthening of the steel sheet through microstructure control by hot rolling. When obtaining this effect, the effect is exhibited greatly, by containing one or two or more of Ni, Cu, Cr, and Mo in an amount of 0.01% or more, respectively. Therefore, when obtaining the effect, the amount of each is preferably 0.01% or more.

On the other hand, in a case where the amount of each element exceeds 2.00%, weldability, hot workability, and the like are deteriorated. Therefore, even when these are contained, the amount of each of Ni, Cu, Cr, and Mo is set to 2.00% or less.

W: 0 to 0.100%

W is an element that contributes to the improvement of the strength of the steel sheet through precipitation hardening. When obtaining this effect, the W content is preferably set to 0.005% or more.

On the other hand, in a case where the W content exceeds 0.100%, not only the effect is saturated but also the hot workability is deteriorated. Therefore, even when this is contained, the W content is set to 0,100% or less.

B: 0 to 0.0100%

B is an element effective for controlling the transformation during hot rolling and improving the strength of the steel sheet through the structure strengthening. When obtaining this effect, the B content is preferably set to 0.0005% or more.

On the other hand, in a case where the B content exceeds 0.0100%, not only the effect is saturated, but also iron-based boride is precipitated, and an effect of improving hardenability by a solid solution B is lost. Therefore, even when this is contained, the B content is set to 0.0100% or less. The B content is preferably 0.0080% or less, and more preferably 0.0050% or less.

REM: 0 to 0.0300%

Ca: 0 to 0.0300%

Mg: 0 to 0.0300%

REM, Ca, and Mg are elements that affect the strength of the steel sheet and contribute to improvement of a material properties. In a case where a total of one or two or more of REM, Ca, and Mg is less than 0.0003%, a sufficient effect cannot be obtained. Therefore, when obtaining the effect, the total amount of REM, Ca, and Mg is preferably set to 0.0003% or more.

On the other hand, in a case where the amount of each of REM, Ca, and Mg exceeds 0.0300%, castability or hot workability is deteriorated. Therefore, even when these are contained, the amount of each is set to 0.0300% or less.

In the present embodiment, REM is an abbreviation for Rare Earth Metal and refers to an element belonging to the lanthanoid series, and the REM content is the total amount of these elements. REM is often added as mischmetal, and in addition to Ce, REM may contain elements of the lanthanoid series in a complex manner. Even in a case where the steel sheet according to the present embodiment contains elements of the lanthanoid series other than La or Ce as impurities, the effect is exhibited. In addition, although a metal is added, the effect is exhibited.

As described above, the steel sheet according to the present embodiment contains basic elements, contains any elements, as necessary, and the remainder consists of Fe and impurities. The impurities refer to compositions that are unintentionally contained from a raw material in the manufacturing process of the steel sheet, or in other manufacturing steps. For example, as the impurities, O may be contained in a trace amount, in addition to P, S, and N. O may form oxide and may be present as inclusions.

The steel sheet according to the present embodiment may further include a hot-dip galvanized layer on its surface. In addition, the hot-dip galvanizing may be hot-dip galvannealing subjected to a galvannealing treatment.

Since the galvanizing contributes to the improvement of corrosion resistance, it is desirable to use a hot-dip galvanized steel sheet or hot-dip galvannealed steel sheet, in a case where the steel sheet is applied for the usage where corrosion resistance is expected.

Since there is a concern that the undercarriage compartments of a vehicle may be pitted due to corrosion, it may not be possible to thin the undercarriage compartments a certain sheet thickness or less, even in a case where the high-strengthening is performed. One object of high-strengthening of the steel sheet is reducing weight by thinning. Accordingly, although the high-strength steel sheet is developed, the application site is limited, in a case where the corrosion resistance is low. As a method for solving these problems, it is considered that the steel sheet is subjected to plating such as hot-dip galvanizing with high corrosion resistance. Since the steel sheet compositions are controlled as described above, the steel sheet according to the present embodiment can be subjected to the hot-dip galvanizing.

The plating layer may be electrogalvanized layer, or may be a plating containing Al and/or Mg, in addition to Zn.

Next, a preferable method for manufacturing the steel sheet according to the present embodiment will be described. The effect can be obtained, as tong as the steel sheet according to the present embodiment has the above-mentioned characteristics, regardless of the manufacturing method. However, the following method is preferable, because it can be stably manufactured.

Specifically, the steel sheet according to the present embodiment can be manufactured by a manufacturing method including the following steps (I) to (VI).

(I) A heating step of heating a slab having a predetermined chemical composition to 1,230° C. or higher
(II) A hot rolling step of performing hot rolling with respect to the slab so that a finish rolling temperature is 930° C. or higher to obtain a hot-rolled steel sheet
(III) A coiling step of coiling the hot-rolled steel sheet at 300° C. or higher and 600° C. or lower and cooling it to room temperature
(IV) A pickling step of pickling the hot-rolled steel sheet after the coiling step
(V) A light reduction step of reducing the hot-rolled steel sheet after the pickling step with a rolling reduction of more than 5% and 30% or less
(VI) A reheating step of reheating the hot-rolled steel sheet after the light reduction step to a temperature range of 450° C. to Ac1° C. and holding it for 10 to 1500 seconds Hereinafter, preferable conditions for each step will be described.

<Heating Step>

In the heating step, the slab having the above-mentioned chemical composition to be subjected to the hot rolling step is heated to 1,230° C. or higher. The reason for setting the heating temperature to 1,230° C. or higher is to dissolve elements such as Ti, Nb, and V contained in the slab that contribute to precipitation hardening (in many cases, they are present as coarse precipitate of more than 5.0 nm in the slab) to precipitate $5.0 \times 10^9$ pieces/mm$^3$ or more of the precipitate containing Ti and having an equivalent circle diameter of 5.0 nm or less in the subsequent heat treatment step. In order to ensure the precipitate having a predetermined number density, it is necessary to use a large amount of Ti, Nb, and V. Accordingly, it is necessary to heat the slab at a temperature equal to or higher than those in the invention of the related art (Patent Documents 1 and 2). In a case where the heating temperature is less than 1,230° C., Ti, Nb, and V are not sufficiently dissolved. The upper limit of the heating temperature is not particularly limited, but in a case where it exceeds 1,400° C., not only the effect is saturated, but also the scale formed on the slab surface is dissolved, and the dissolved oxide damages a refractory in a heating furnace, which is not preferable. Therefore, the heating temperature is preferably 1.400° C. or lower.

<Hot Rolling Step>

The hot rolling is performed with respect to the heated slab. In the hot rolling, rough rolling is performed as necessary, and then finish rolling is performed. A finish rolling temperature (finish rolling completion temperature) is set to 930° C. or higher.

Since the steel sheet according to the present embodiment contains a large amount of Ti, Nb, and V, in a case where the temperature of the slab or the roughly rolled hot-rolled steel sheet before the finish rolling is decreased, precipitate containing Ti is formed. The carbide containing Ti which is precipitated at this stage has a large size. Accordingly, it is necessary to carry out the finish rolling and the coiling while suppressing the precipitate containing Ti before the finish rolling. In a case where the finish rolling temperature is lower than 930° C., the formation of precipitate containing Ti is remarkable. Accordingly, the finish rolling temperature is set to 930° C. or higher. It is not necessary to particularly limit the upper limit of the finish rolling temperature.

<Coiling Step>

The steel sheet after the hot rolling step (hot-rolled steel sheet) is cooled and then coiled. A coiling temperature of the hot-rolled steel sheet is set to 300° C. or higher and 600° C. or lower, and after the coiling, the hot-rolled steel sheet is cooled to room temperature in a state of a coil.

Any method can be used for cooling to the coiling temperature, as long as it can be cooled, but a method for cooling using water from a nozzle is generally used, and productivity is also excellent. A cooling rate for water cooling is, for example, 20° C./sec or higher.

In a case where the coiling temperature exceeds 600° C., ferrite is formed, and the volume percentage of tempered martensite and bainite cannot be 95% or more, resulting in an inferior balance between strength and formability. In addition, in a case where the coiling temperature exceeds 600° C., precipitate having an equivalent circle diameter more than 5.0 nm is formed in martensite and bainite, the number density of the precipitate having an equivalent circle diameter of 5.0 nm or less to be precipitated in the subsequent heat treatment step decreases, and the number density of the precipitate may be lower than $5.0 \times 10^9$ pieces/mm$^3$. On the other hand, in a case where the coiling temperature is lower than 300° C., the structure has martensite as the primary phase, and the high-strengthening is easily performed, but the ductility is lowered. Therefore, in order to satisfy both high ductility and high strength, it is necessary to set the coiling temperature to 300° C. or higher.

The martensite after the coiling step may be either as-quenched martensite (fresh martensite) containing almost no iron-based carbide, or auto-tempered martensite in which iron-based carbide is precipitated in the martensite, in a case where it is cooled to room temperature after coiling.

The cooling conditions during cooling the coil to room temperature are not particularly limited, and for example, the coil may be left to cool to room temperature. Alternatively, even if the water cooling is performed for the purpose of shortening the cooling period, the desired hot-rolled coil can be obtained.

Figure 1B:
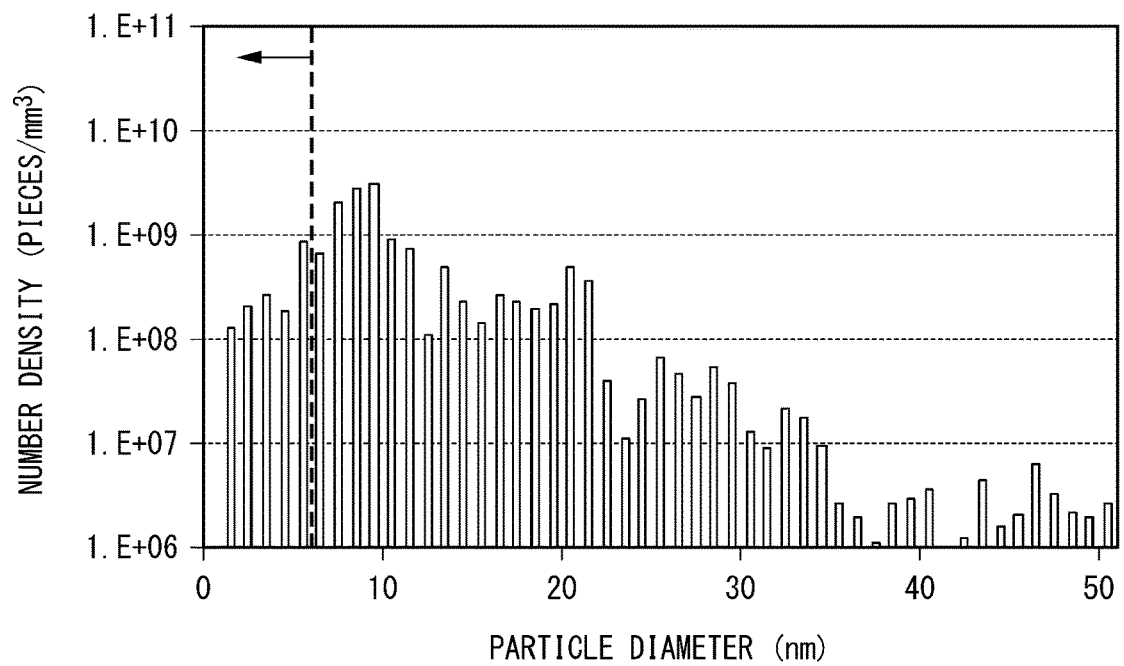
FIG. 1B is a diagram showing the number density of precipitate containing Ti of a comparative steel in each particle diameter.
Figure 2A:
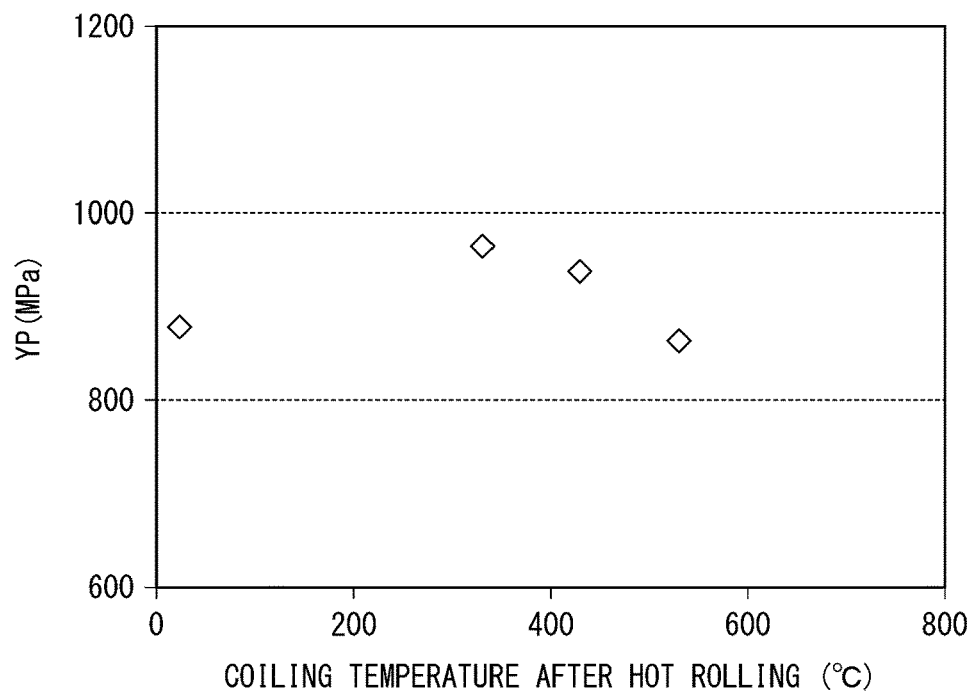
FIG. 2A is a diagram showing the relationship between the coiling temperature after hot rolling and YP (proof stress).
Figure 2B:
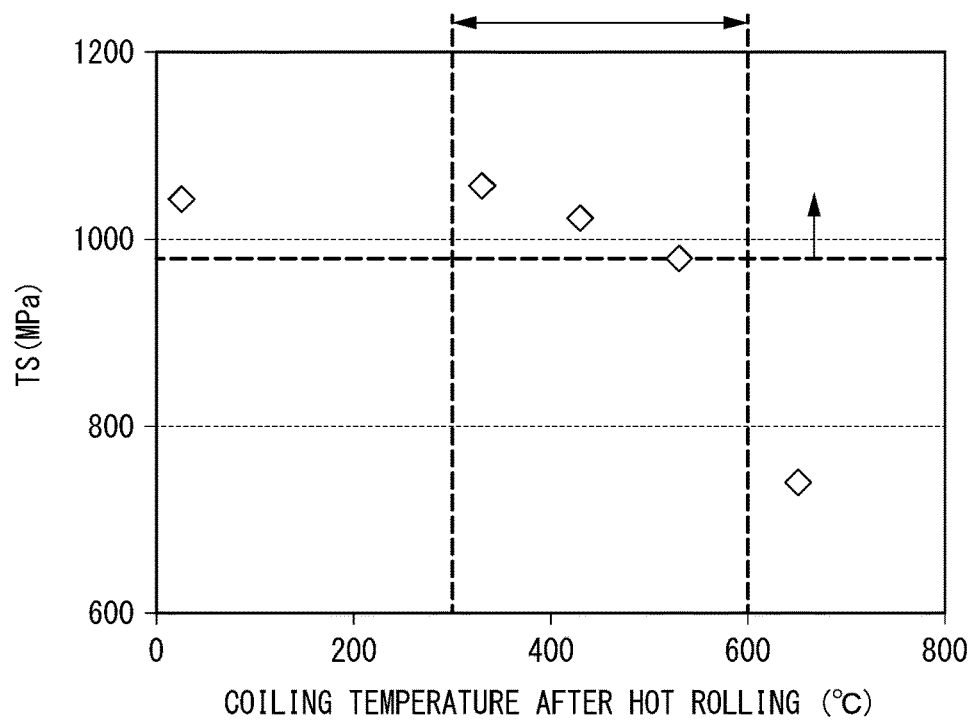
FIG. 2B is a diagram showing the relationship between the coiling temperature after hot rolling and TS (tensile strength).
Figure 2C:
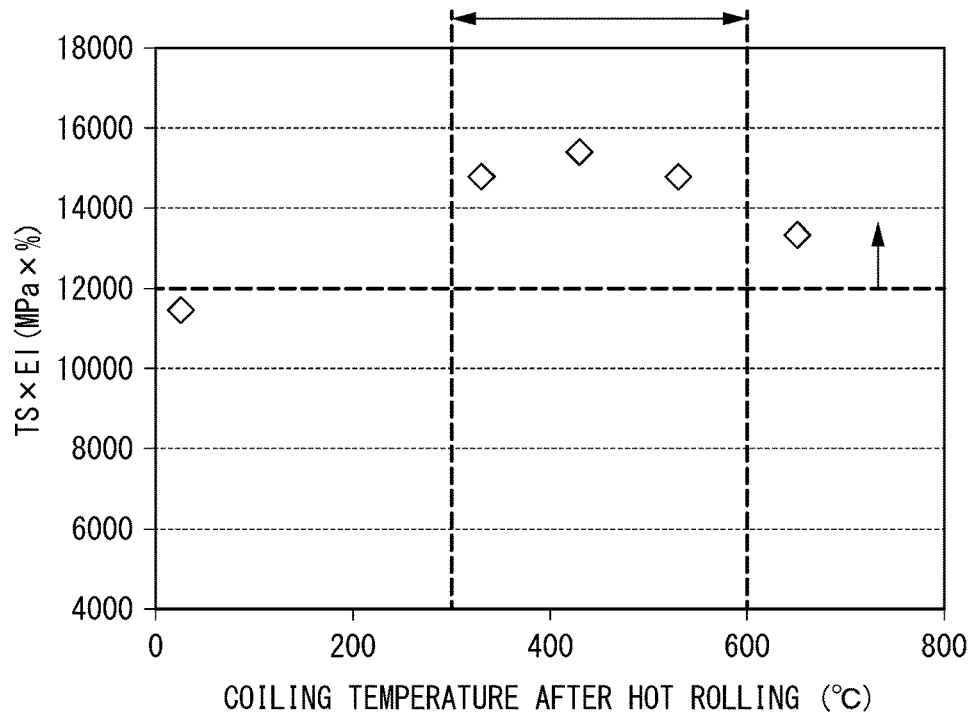
FIG. 2C is a diagram showing the relationship between the coiling temperature after hot rolling and TS×El (elongation).
Figure 2D:
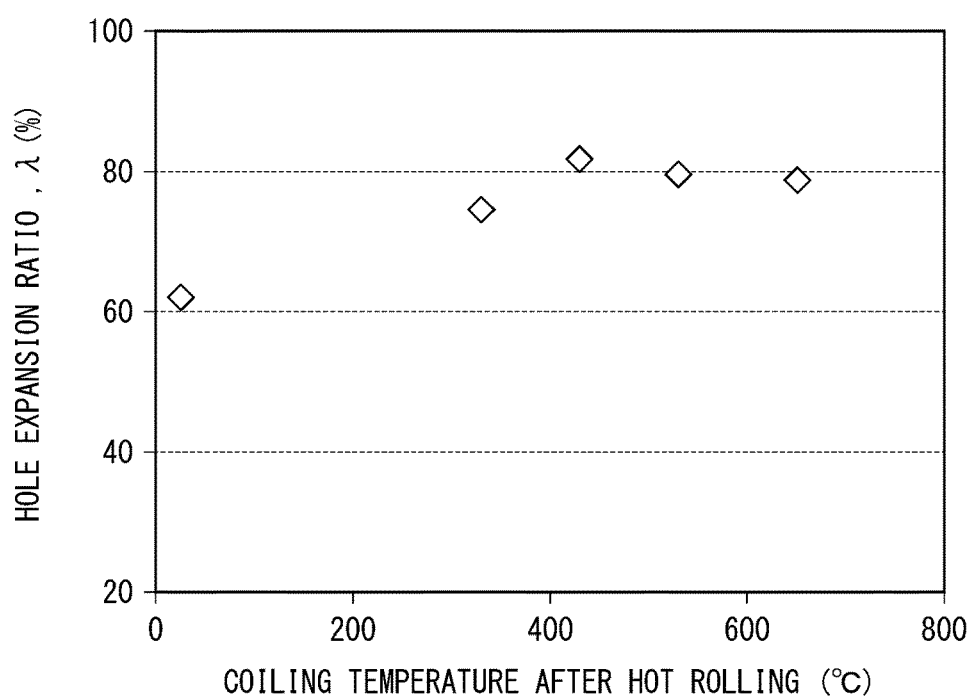
FIG. 2D is a diagram showing the relationship between the coiling temperature after hot rolling and $\lambda$ (hole expansion ratio).
Figure 3A:
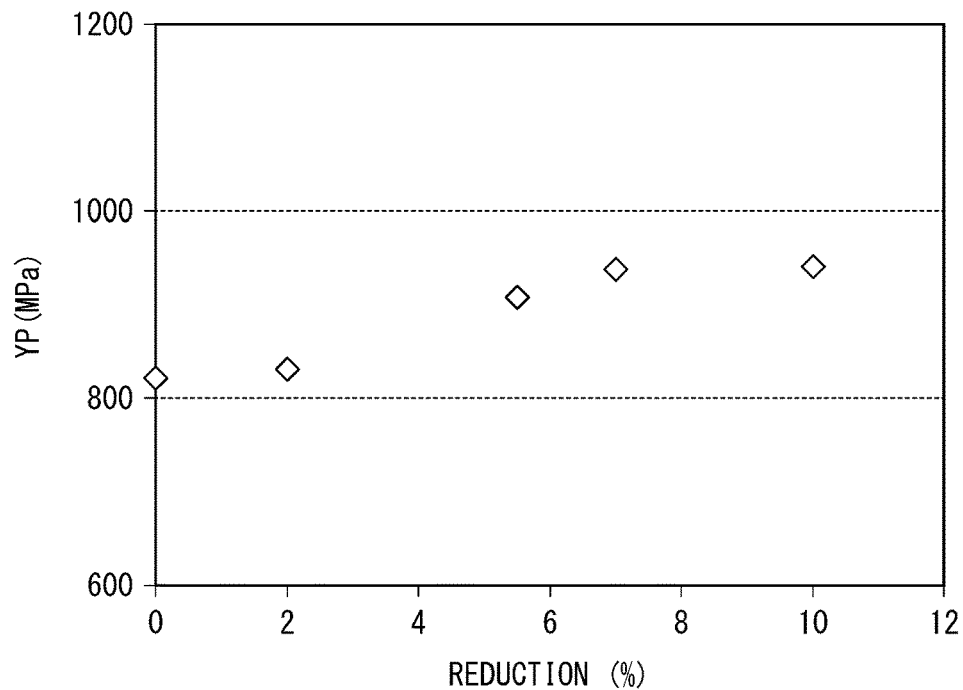
FIG. 3A is a diagram showing the relationship between the rolling reduction under light reduction and YP (proof stress).
Figure 3B:
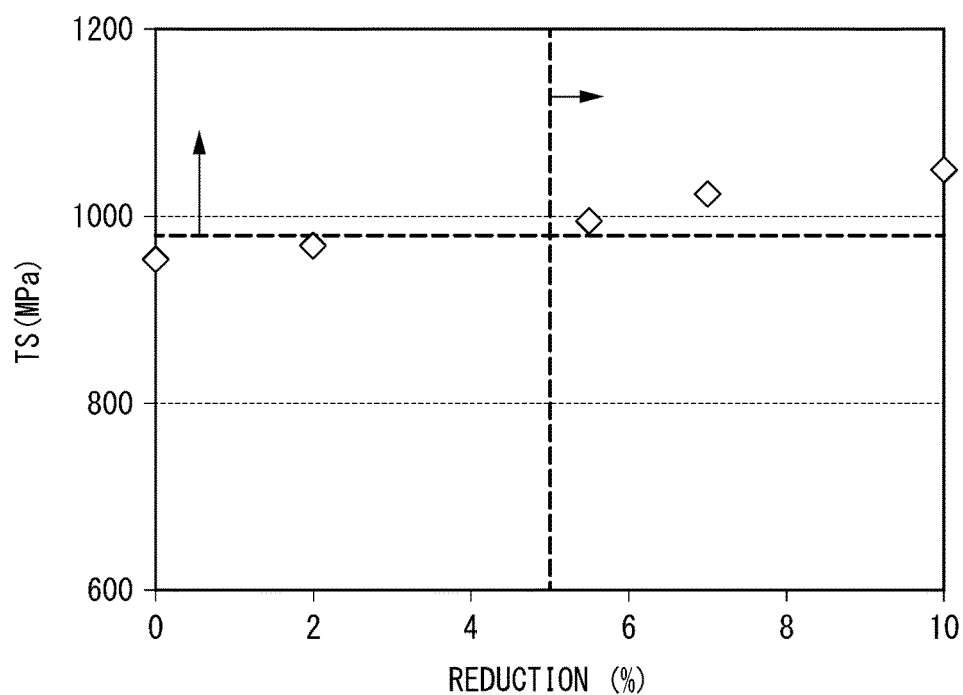
FIG. 3B is a diagram showing the relationship between the rolling reduction under light reduction and TS (tensile strength).
Figure 3C:
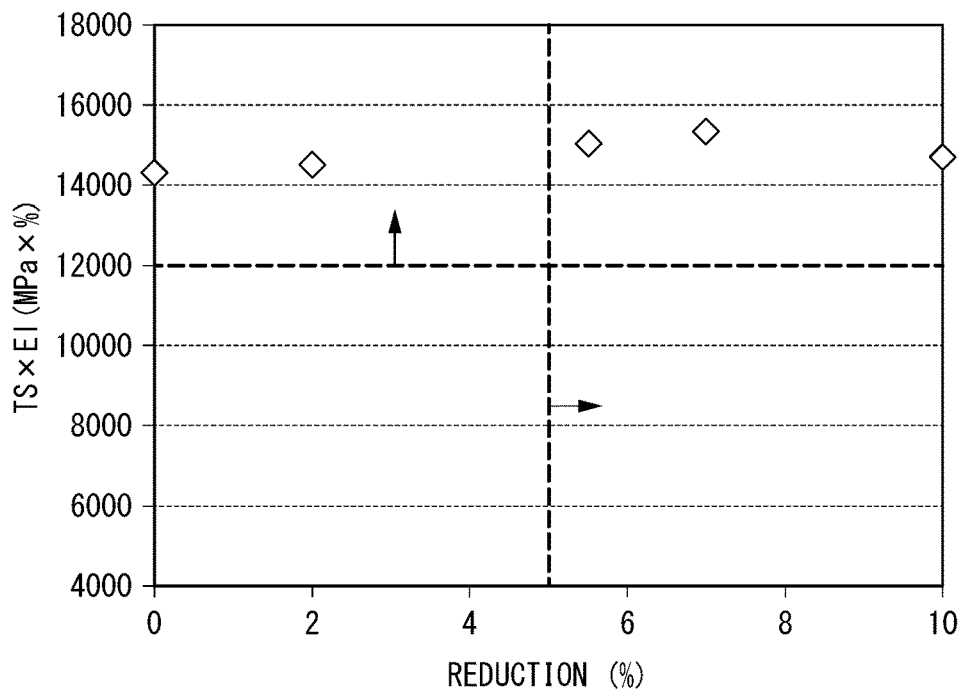
FIG. 3C is a diagram showing the relationship between the rolling reduction under light reduction and TS×El (elongation).
Figure 3D:
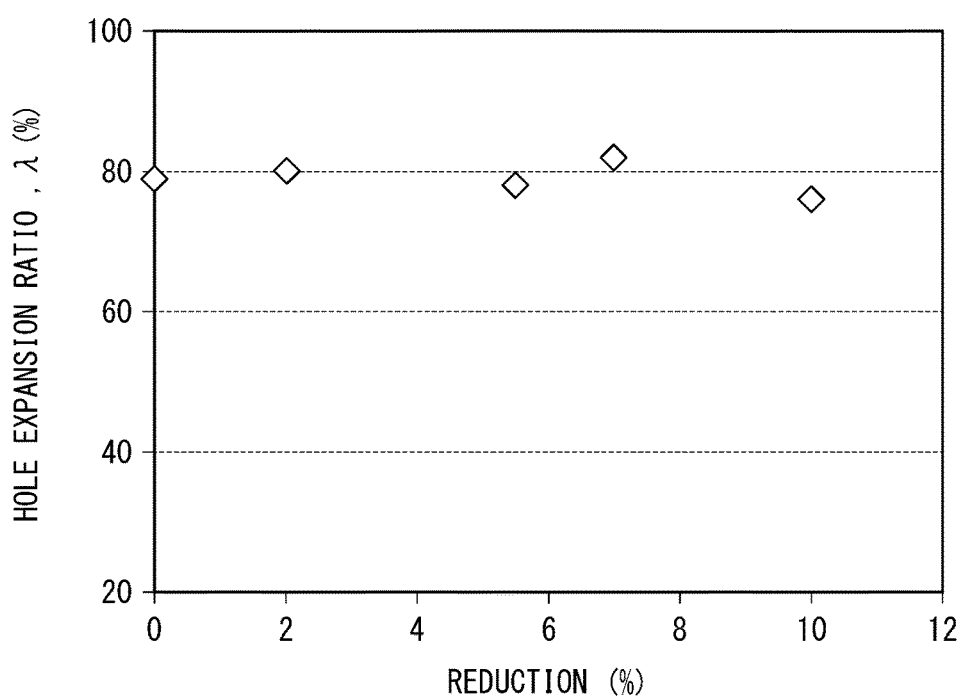
FIG. 3D is a diagram showing the relationship between the rolling reduction under light reduction and k (hole expansion ratio).
Figure 4A:
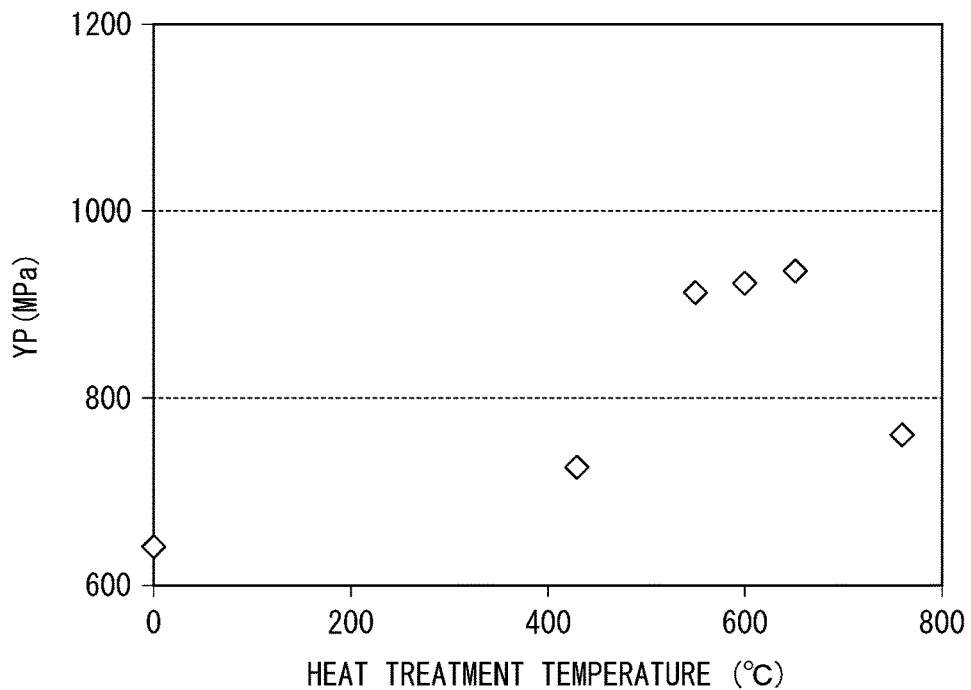
FIG. 4A is a diagram showing the relationship between the heat treatment temperature in a reheating step and YP (proof stress).
Figure 4B:
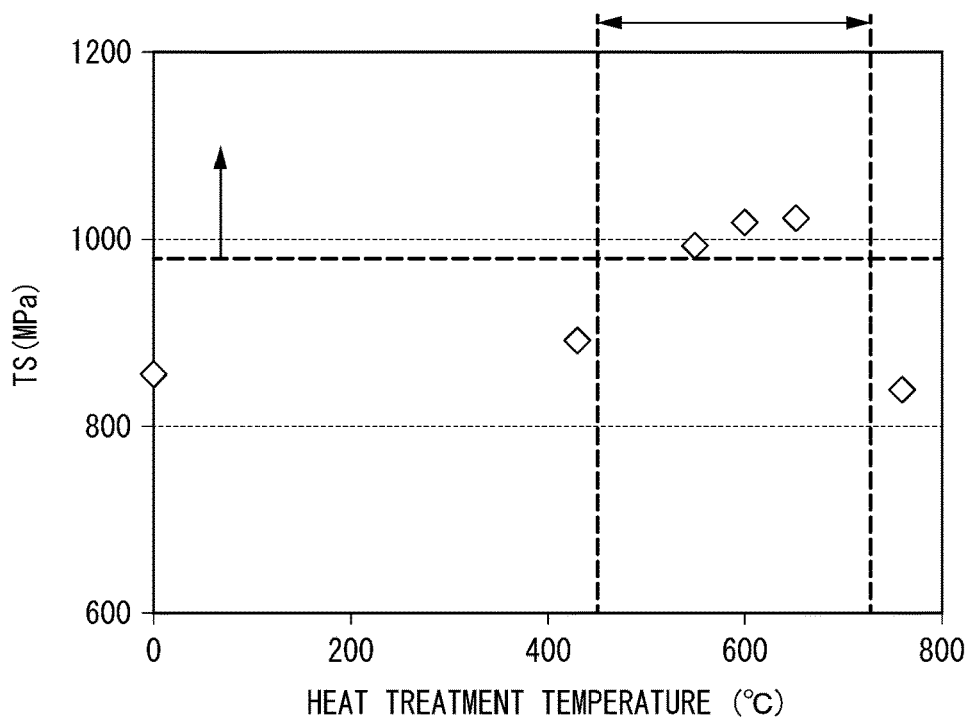
FIG. 4B is a diagram showing the relationship between the heat treatment temperature in the reheating step and TS (tensile strength).
Figure 4C:
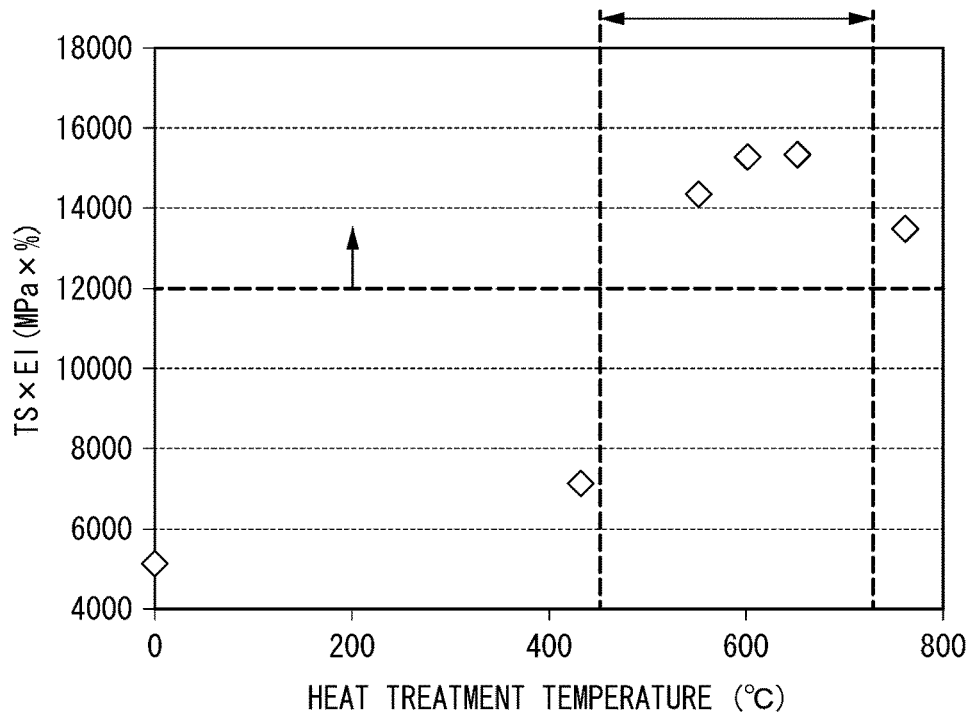
FIG. 4C is a diagram showing the relationship between the heat treatment temperature in the reheating step and TS×El (elongation).
Figure 4D:
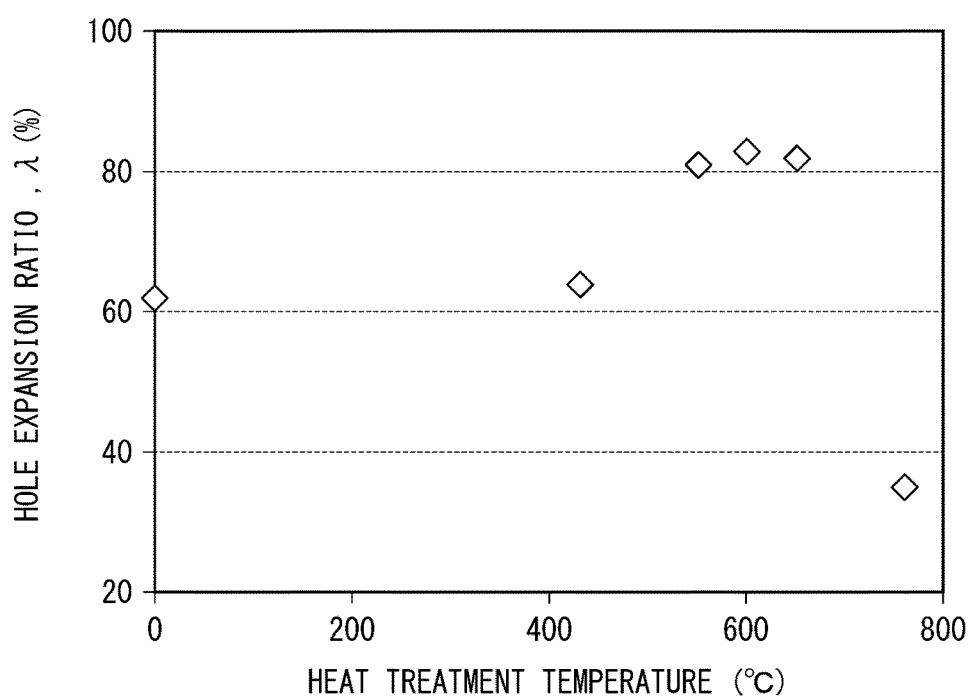
FIG. 4D is a diagram showing the relationship between the heat treatment temperature in the reheating step and K (hole expansion ratio).
Figure 5A:
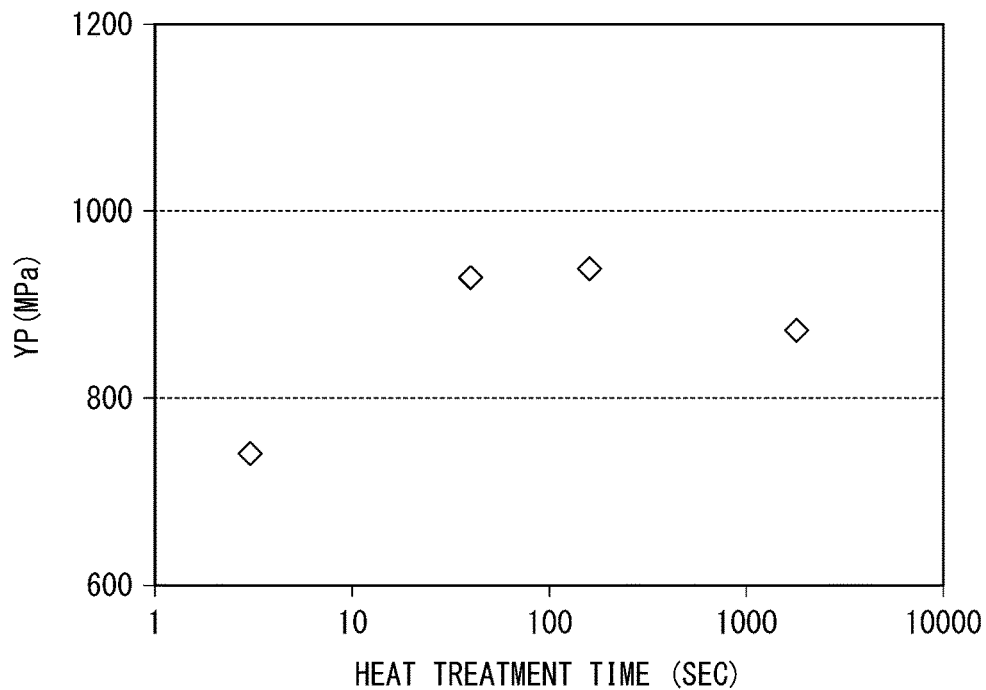
FIG. 5A is a diagram showing the relationship between the heat treatment time in the reheating step and YP (proof stress).
Figure 5B:
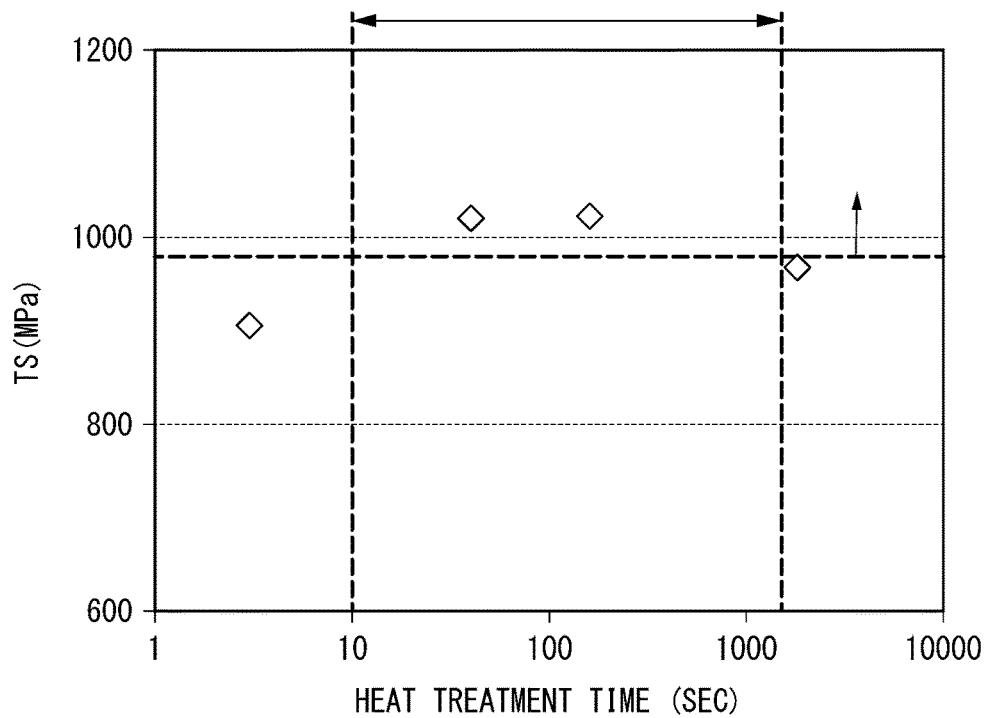
FIG. 5B is a diagram showing the relationship between the heat treatment time in the reheating step and TS (tensile strength).
Figure 5C:
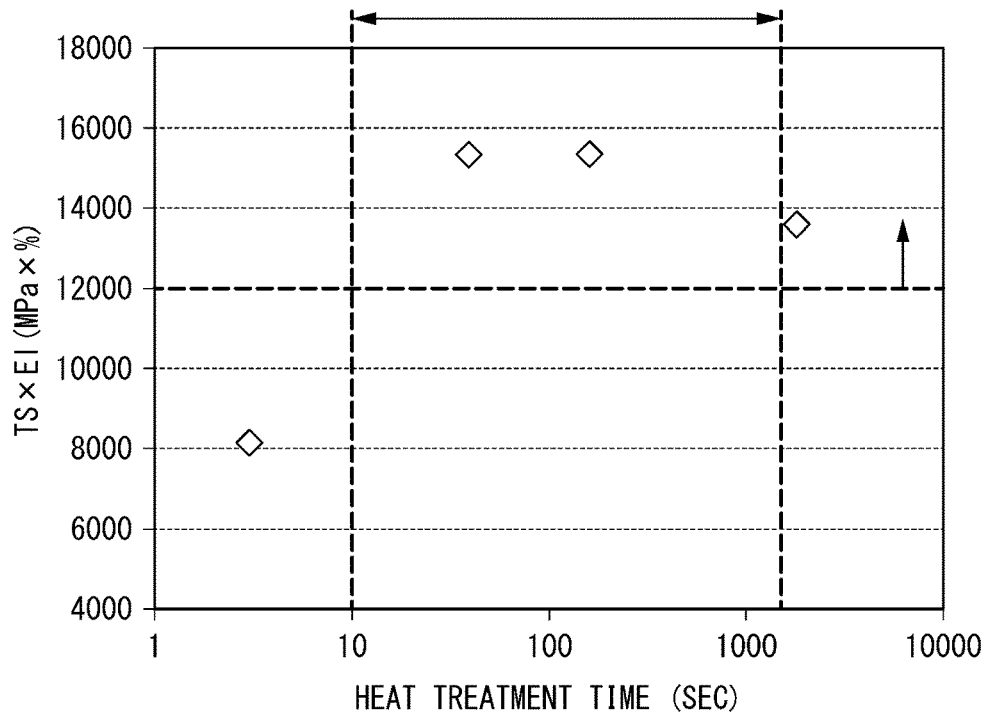
FIG. 5C is a diagram showing the relationship between the heat treatment time in the reheating step and TS×El (elongation).
Figure 5D:
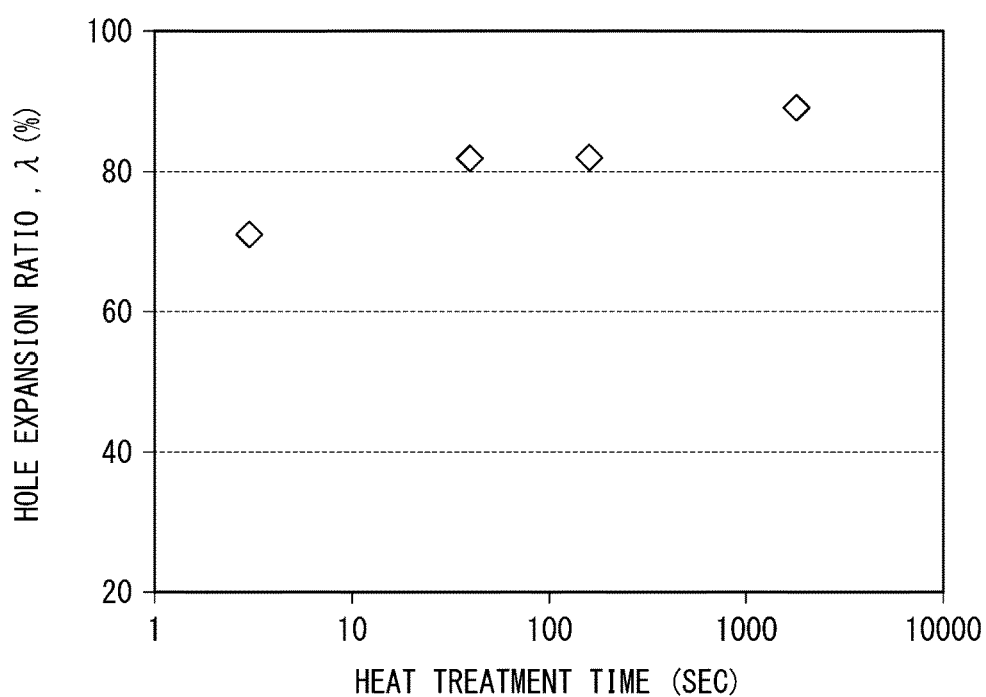
FIG. 5D is a diagram showing the relationship between the heat treatment time in the reheating step and k (hole expansion ratio).

FIGS. 1A and 1B show diagrams showing the number density of each particle diameter (equivalent circle diameter) of the precipitate containing Ti, in an example in which the coiling temperature is 500° C. and the rolling reduction under light reduction is 7% and an example in which the coiling temperature is 650° C. and the rolling reduction under light reduction is 7%.

In addition, as shown in FIGS. 2A to 2D, the characteristics change depending on the coiling temperature.

It is considered that, it is because, as shown in FIG. 1A, by coiling at an appropriate temperature, the number density (number density on the left side of a broken line in the drawing) of the precipitate containing Ti and the particle diameter (equivalent circle diameter) of 5.0 nm or less increases.

<Pickling Step>

The hot-rolled steel sheet after the coiling step is pickled. By performing the pickling, it is possible to improve the plating property in the subsequent manufacturing step and increase the chemical convertibility in the vehicle manufacturing step. In addition, in a case where the hot-rolled steel sheet with a scale is lightly reduced, the scale is peeled off and is pushed in, which may cause a defect. Therefore, the hot-rolled steel sheet is pickled before the light reduction. The pickling conditions are not particularly limited, but the pickling is generally performed with hydrochloric acid or sulfuric acid containing an inhibitor.

<Light Reduction Step>

In the light reduction step, reduction is applied to the hot-rolled steel sheet after the pickling step at rolling reduction of more than 5% and 30% or less.

By applying the reduction to the hot-rolled steel sheet, a precipitation site for precipitation of the precipitate in the heat treatment which is the subsequent step is introduced. By introducing the precipitation site, the fine carbide containing Ti and having an equivalent circle diameter of 5.0 nm or less can be precipitated by $5.0 \times 10^9$ pieces/mm$^3$ or more by the heat treatment. In addition, as shown in FIGS. 4A to 4D, the TS, the Hvs/Hvc, and fatigue limit can be increased by setting the rolling reduction to more than 5%. Therefore, the reduction at rolling reduction of more than 5% is applied.

Meanwhile, in a case where the rolling reduction exceeds 30%, not only the effect is saturated, but also the recovery of the introduced dislocation becomes insufficient, resulting in a great deterioration in elongation. In addition, in the reheating step, which is a subsequent step, recrystallization may occur depending on the heating temperature and heating time, and the consistency between the Ti precipitate and a primary phase (here, recrystallized ferrite) is lost, and the amount of precipitation hardening is reduced. In this case, it is difficult to ensure a tensile strength of 980 MPa or more. Therefore, the rolling reduction is set to 30% or less. The rolling reduction is preferably less than 20%, and more preferably less than 15%.

In a case where the dislocation that acts as a nucleation site of the precipitate can be introduced, the reduction may be performed by reducing the pressure by more than 5% and 30% or less in one pass, or by dividing into a plurality of times and the reduction may be performed so that the cumulative rolling reduction is more than 5% and 30% or less.

As shown in FIGS. 3A to 3D, high strength and high ductility can be obtained by setting the rolling reduction under light reduction to more than 5%.

In the method for manufacturing the steel sheet according to the present embodiment, the light reduction step is the most important step and is a step with a role different from a so-called cold rolling. That is, the cold rolling is usually performed for controlling the sheet thickness of the steel sheet, controlling a texture or controlling the grain diameter by using recrystallization. However, the light reduction step in the present embodiment is performed, in order to promote the fine carbide precipitation due to the introduction of dislocation, as described above.

<Reheating Step>

The hot-rolled steel sheet after the light reduction step is performed heat treatments in which the hot-rolled steel sheet is reheated to a temperature range of 450° C. to Ac1° C. and held at this temperature range for 10 to 1,500 seconds. By performing the heat treatment by reheating the hot-rolled steel sheet after the light reduction step, the carbide containing Ti and having an equivalent circle diameter of 5.0 nm or less can be precipitated by $5.0 \times 10^9$ pieces/mm$^3$ or more. In a case where the heat treatment temperature (reheating temperature) is lower than 450° C., the diffusion of atoms is insufficient and a sufficient amount of the precipitate cannot be obtained. Considering the heat treatment in a short period of time, the heat treatment temperature is desirably 500° C. or higher. In a case where the heat treatment temperature exceeds Ac1° C., the precipitate is coarsened and ferrite is formed from the austenite formed in the heat treatment during the cooling. Accordingly, the total volume percentage of tempered martensite and bainite may not be 95% or more, and a consistent relationship between the Ti precipitate and the primary phase (here, bainite or martensite transformed from the austenite in the cooling process) may collapse due to the transformation to the austenite, and the amount of precipitation hardening is reduced. As a result, it is difficult to ensure the tensile strength of 980 MPa or more, although the number density of the precipitate is within the above range. Therefore, the heat treatment temperature is set to Ac1° C. or lower and desirably 700° C. or lower. Ac (Ac1 transformation point) (° C.) can be specified by measuring the expansion curve during the heating. Specifically, the Ac1 transformation point can be specified by measuring the transformation curve during the heating at 5° C./sec.

In addition, as shown in FIGS. 4A to 4D, high strength and high ductility can be obtained by setting the reheating temperature (heat treatment temperature) to 450 to Ac1° C.

In a case where the heat treatment time in the reheating step is shorter than 10 seconds, the diffusion of atoms is insufficient, and the carbide containing Ti and having an equivalent circle diameter of 5.0 nm or less cannot be precipitated by $5.0 \times 10^9$ pieces/mm$^3$ or more. In a case where the heat treatment time exceeds 1,500 seconds, the precipitate becomes coarse, and the number of precipitates containing Ti and having an equivalent circle diameter of 5.0 nm or less is less than $5.0 \times 10^9$ pieces/mm$^3$. For this reason, it is necessary to set the heat treatment time to 10 to 1,500 seconds. The heat treatment in the temperature range of 450° C. to Ac1° C. also includes heating and slow cooling in this temperature range. That is, the heat treatment time means the time during which the steel sheet is in the temperature range of 450° C. to Ac1° C. after the reheating, and in a case where the steel sheet is held in this temperature range for a predetermined time, the temperature may change in the middle.

As shown in FIGS. 5A to 5D, high strength and high ductility can be obtained by setting the reheating time (heat treatment time) to be in the range of 10 to 1,500 seconds.

The cooling after the holding step is not particularly limited.

The steel sheet according to the present embodiment can be obtained by a manufacturing method including the above steps. However, in a case where the steel sheet according to the present embodiment is a hot-dip galvanized steel sheet or a hot-dip galvannealed steel sheet, in order to improve corrosion resistance, it is preferable that the following steps are further included.

<Plating Step>

The hot-rolled steel sheet after the reheating step is subjected to hot-dip galvanizing. Since the galvanizing contributes to the improvement of corrosion resistance, it is desirable to perform galvanizing, in a case where the steel sheet is applied for the usage where corrosion resistance is expected. The galvanizing is preferably hot-dip galvanizing. The conditions for hot-dip galvanizing are not particularly limited, and well-known conditions may be used.

The hot-rolled steel sheet after hot-dip galvanizing (hot-dip galvanized steel sheet) is heated to 460° C. to 600° C. to galvannealing plating (galvannealing step). Accordingly, it is possible to manufacture a hot-dip galvannealed steel sheet in which a hot-dip galvanized layer is a hot-dip galvannealed layer. The hot-dip galvannealed steel sheet may be subjected to galvannealing according to the usage, since the effect of improving spot weldability or improving sliding ability during drawing can be applied, in addition to the improvement of corrosion resistance.

Even in a case where Al plating, plating containing Mg, and electroplating are performed, other than galvanizing, it is possible to manufacture a steel sheet according to the present embodiment having a tensile strength of 980 MPa or more and excellent fatigue resistance.

EXAMPLES

Steels having chemical compositions shown in kinds of steel A to P and a to f in Table 1 were dissolved, and a slab having a thickness of 240 to 300 mm was manufactured by continuous casting.

The obtained slab was heated and subjected to finish rolling under conditions shown in Tables 2-1 and 2-2 to obtain a hot-rolled steel sheet having a thickness of 2.3 mm, and the hot-rolled steel sheet was subjected to water cooling to the coiling temperature, coiled as a coil, and air-cooled to room temperature.

After the coil was uncoiled, the pickling was performed, and the hot-rolled steel sheet after the pickling was lightly reduced at the rolling reductions shown in Tables 2-1 and 2-2. However, in Tables 2-1 and 2-2, the light reduction was not performed for examples in which the rolling reduction was 0%.

The hot-rolled steel sheet after the light reduction (hot-rolled steel sheet after the pickling, in a case where the light reduction is not performed) was subjected to heat treatment by reheating at a temperature shown in Tables 2-1 and 2-2, to manufacture hot-rolled steel sheets having steel numbers A1 to f1.

With respect to the hot-rolled steel sheet after the heat treatment, the plating was performed, as necessary, and in some examples, further galvannealing treatment was performed. In Tables 2-1 and 2-2, HR indicates a hot-rolled steel sheet not subjected to plating, GI indicates a hot-dip galvanized steel sheet, and GA indicates a hot-dip galvannealed steel sheet.

TABLE 1

| Kind of steel | Mass % Remainder Fe and impurities | | | | | | | | | | | | | |
|---|---|---|---|---|---|---|---|---|---|---|---|---|---|---|
| | C | Si | Mn | Ti | Nb | V | Al | P | S | N | Ni | Cu | Cr | Mo |
| A | 0.06 | 1.36 | 2.63 | 0.112 | 0.000 | 0.000 | 0.032 | 0.008 | 0.003 | 0.004 | | | | |
| B | 0.05 | 0.23 | 2.03 | 0.121 | 0.000 | 0.000 | 0.019 | 0.008 | 0.002 | 0.003 | | | | |
| C | 0.07 | 0.47 | 2.13 | 0.113 | 0.020 | 0.000 | 0.023 | 0.009 | 0.002 | 0.003 | | | | |
| D | 0.05 | 0.45 | 1.86 | 0.082 | 0.050 | 0.000 | 0.025 | 0.007 | 0.002 | 0.003 | | | | |
| E | 0.06 | 0.50 | 2.06 | 0.076 | 0.040 | 0.050 | 0.029 | 0.011 | 0.002 | 0.003 | | | | |
| F | 0.07 | 0.39 | 2.06 | 0.105 | 0.020 | 0.000 | 0.038 | 0.009 | 0.000 | 0.002 | | | | 0.19 |
| G | 0.06 | 0.42 | 1.45 | 0.110 | 0.010 | 0.000 | 0.026 | 0.009 | 0.003 | 0.001 | | 0.88 | | |
| H | 0.06 | 0.36 | 1.74 | 0.109 | 0.020 | 0.000 | 0.027 | 0.009 | 0.003 | 0.004 | 0.26 | 0.18 | | |
| I | 0.07 | 0.41 | 1.96 | 0.096 | 0.030 | 0.060 | 0.034 | 0.008 | 0.004 | 0.003 | | | 0.73 | |
| J | 0.06 | 0.03 | 2.03 | 0.089 | 0.030 | 0.000 | 0.319 | 0.010 | 0.002 | 0.003 | | | | |
| K | 0.05 | 0.42 | 1.89 | 0.113 | 0.010 | 0.030 | 0.032 | 0.009 | 0.002 | 0.003 | | | | |
| L | 0.06 | 0.53 | 2.04 | 0.106 | 0.010 | 0.000 | 0.006 | 0.008 | 0.002 | 0.002 | | | | |
| M | 0.07 | 0.51 | 2.24 | 0.094 | 0.020 | 0.000 | 0.029 | 0.009 | 0.003 | 0.003 | | | | |
| N | 0.07 | 0.42 | 1.89 | 0.089 | 0.020 | 0.080 | 0.035 | 0.008 | 0.002 | 0.003 | | | | |
| O | 0.08 | 0.43 | 2.13 | 0.156 | 0.030 | 0.000 | 0.008 | 0.010 | 0.002 | 0.003 | | | | |
| P | 0.08 | 1.06 | 2.06 | 0.159 | 0.010 | 0.140 | 0.056 | 0.011 | 0.001 | 0.004 | | | | |
| a | 0.01 | 1.03 | 1.94 | 0.162 | 0.030 | 0.000 | 0.061 | 0.006 | 0.001 | 0.003 | | | | |
| b | 0.18 | 0.42 | 2.12 | 0.148 | 0.000 | 0.000 | 0.019 | 0.016 | 0.006 | 0.003 | | | | |
| c | 0.06 | 0.56 | 0.46 | 0.152 | 0.030 | 0.000 | 0.034 | 0.009 | 0.004 | 0.002 | | | | |
| d | 0.07 | 0.76 | 2.53 | 0.000 | 0.000 | 0.000 | 0.049 | 0.012 | 0.003 | 0.003 | | | | |
| e | 0.06 | 0.43 | 2.16 | 0.005 | 0.050 | 0.020 | 0.038 | 0.012 | 0.004 | 0.002 | | | | |
| f | 0.05 | 0.29 | 2.26 | 0.044 | 0.030 | 0.000 | 0.029 | 0.015 | 0.003 | 0.002 | | | | |

| Kind of steel | Mass % Remainder Fe and impurities | | | | | Ti + Nb + V (%) | Ac1 (° C.) | Ms (° C.) | Note |
|---|---|---|---|---|---|---|---|---|---|
| | W | B | REM | Ca | Mg | | | | |
| A | | | | | | 0.112 | 737 | 426 | Steel of present invention |
| B | | 0.0019 | | | | 0.121 | 727 | 453 | Steel of present invention |
| C | | 0.0024 | | | | 0.133 | 729 | 442 | Steel of present invention |
| D | | 0.0026 | | | | 0.132 | 732 | 459 | Steel of present invention |
| E | | 0.0026 | | | | 0.166 | 729 | 448 | Steel of present invention |
| F | | | | | | 0.125 | 725 | 444 | Steel of present invention |
| G | | 0.0026 | | | | 0.120 | 735 | 454 | Steel of present invention |

TABLE 1-continued

| | | | | | | | | Note |
|---|---|---|---|---|---|---|---|---|
| H | | 0.0021 | | | 0.129 | 731 | 460 | Steel of present invention |
| I | | | | | 0.186 | 728 | 434 | Steel of present invention |
| J | | 0.0024 | | | 0.119 | 672 | 449 | Steel of present invention |
| K | 0.029 | 0.0016 | | | 0.153 | 730 | 458 | Steel of present invention |
| L | | 0.0027 | 0.0034 | | 0.116 | 734 | 449 | Steel of present invention |
| M | | 0.0026 | | 0.0039 | 0.114 | 727 | 437 | Steel of present invention |
| N | | 0.0019 | | | 0.189 | 728 | 451 | Steel of present invention |
| O | | 0.0022 | | | 0.0026 | 0.186 | 730 | 438 | Steel of present invention |
| P | | 0.0026 | | | 0.309 | 734 | 441 | Steel of present invention |
| a | | 0.0028 | | | 0.192 | 736 | 471 | Comparative steel |
| b | | 0.0041 | | | 0.148 | 726 | 402 | Comparative steel |
| c | | 0.0039 | | | 0.182 | 748 | 510 | Comparative steel |
| d | | 0.0024 | | | <u>0.000</u> | 725 | 426 | Comparative steel |
| e | | 0.0022 | | | <u>0.075</u> | 725 | 444 | Comparative steel |
| f | | 0.0019 | | | <u>0.074</u> | 723 | 444 | Comparative steel |

The underlined numbers are outside of the range of the present invention.

TABLE 2-1

| Steel number | Kind of steel | Slab heating temperature (°C.) | Finish rolling temperature (°C.) | Coiling temperature (°C.) | Pickling | Rolling reduction under light reduction (%) | Heat treatment temperature (°C.) | Holding time (sec) | Plating and the like | Galvannealing temperature (°C.) | Note |
|---|---|---|---|---|---|---|---|---|---|---|---|
| A1 | A | 1290 | 970 | 380 | Performed | 7.0 | 650 | 120 | GA | 580 | Steel of present invention |
| B1 | B | 1280 | 960 | 470 | Performed | 7.0 | 640 | 120 | HR | — | Steel of present invention |
| B2 | B | 1270 | 950 | 470 | Performed | 7.0 | 670 | 120 | GI | — | Steel of present invention |
| B3 | B | 1260 | 970 | 460 | Performed | 7.0 | <u>750</u> | 120 | GA | 560 | Comparative steel |
| B4 | B | 1270 | 950 | 430 | Performed | 7.0 | <u>650</u> | 160 | GA | 560 | Steel of present invention |
| B5 | B | 1260 | 960 | 390 | Performed | 5.5 | 660 | 100 | GA | 570 | Steel of present invention |
| B6 | B | 1260 | 950 | 420 | Performed | 10.0 | 680 | 100 | GA | 560 | Steel of present invention |
| B7 | B | 1270 | 960 | 530 | Performed | 7.0 | 620 | 80 | GA | 570 | Steel of present invention |
| B8 | B | 1280 | 960 | 330 | Performed | 7.0 | 640 | 60 | GA | 570 | Steel of present invention |
| B9 | B | 1260 | 980 | 390 | Performed | 5.5 | — | — | HR | — | Comparative steel |
| B10 | B | <u>1210</u> | 960 | 420 | Performed | 7.0 | 650 | 120 | GA | 560 | Comparative steel |
| B11 | B | 1280 | <u>850</u> | 430 | Performed | 7.0 | 670 | 120 | GA | 570 | Comparative steel |
| B12 | B | 1270 | <u>950</u> | 25 | Performed | 7.0 | 680 | 480 | GA | 570 | Comparative steel |
| B13 | B | 1280 | 990 | <u>650</u> | Performed | 7.0 | 650 | 360 | GA | 570 | Comparative steel |
| B14 | B | 1280 | 960 | <u>430</u> | Performed | 7.0 | 650 | 40 | GA | 560 | Steel of present invention |
| B15 | B | 1290 | 970 | 440 | Performed | 7.0 | 600 | 60 | GA | 560 | Steel of present invention |
| B16 | B | 1270 | 980 | 430 | Performed | 7.0 | 550 | 80 | GA | 560 | Steel of present invention |
| B17 | B | 1270 | 1000 | 520 | Performed | <u>0.0</u> | 640 | 120 | GA | 560 | Comparative steel |
| B18 | B | 1280 | 970 | 490 | Performed | <u>2.0</u> | 650 | 120 | GA | 560 | Comparative steel |
| B19 | B | 1280 | 960 | 480 | Performed | <u>7.0</u> | <u>430</u> | 120 | GA | 570 | Comparative steel |
| B20 | B | 1280 | 960 | 550 | Performed | 9.0 | <u>760</u> | 120 | GA | 560 | Comparative steel |
| B21 | B | 1290 | 970 | 420 | Performed | 7.0 | <u>640</u> | 3 | GA | 560 | Comparative steel |
| B22 | B | 1270 | 970 | 490 | Performed | 7.0 | 690 | <u>1800</u> | GA | 590 | Comparative steel |
| B23 | B | 1280 | 990 | 470 | Performed | 7.0 | <u>800</u> | 120 | GA | 600 | Comparative steel |
| B24 | B | 1270 | 970 | 460 | Performed | <u>35.0</u> | <u>660</u> | 360 | GA | 590 | Comparative steel |
| B25 | B | 1260 | 960 | 500 | Performed | 6.0 | 640 | 120 | GA | 560 | Steel of present invention |

TABLE 2-1-continued

| Steel number | Kind of steel | Slab heating temperature (° C.) | Finish rolling temperature (° C.) | Coiling temperature (° C.) | Pickling | Rolling reduction under light reduction (%) | Heat treatment temperature (° C.) | Holding time (sec) | Plating and the like | Galvannealing temperature (° C.) | Note |
|---|---|---|---|---|---|---|---|---|---|---|---|
| C1 | C | 1280 | 960 | 440 | Performed | 7.0 | 650 | 120 | GA | 540 | Steel of present invention |
| D1 | D | 1270 | 970 | 430 | Performed | 7.0 | 680 | 100 | HR | — | Steel of present invention |
| D2 | D | 1280 | 960 | 450 | Performed | 7.0 | 660 | 100 | GI | — | Steel of present invention |
| D3 | D | 1280 | 970 | 450 | Performed | 7.0 | <u>760</u> | 120 | GA | 560 | Comparative steel |
| D4 | D | 1270 | 970 | 420 | Performed | 7.0 | 650 | 160 | GA | 560 | Steel of present invention |
| D5 | D | 1270 | 970 | 470 | Performed | 5.5 | 640 | 120 | GA | 570 | Steel of present invention |
| D6 | D | 1260 | 960 | 430 | Performed | 10.0 | 650 | 120 | GA | 560 | Steel of present invention |
| D7 | D | 1280 | 970 | 460 | Performed | 7.0 | 660 | 160 | GA | 570 | Steel of present invention |
| D8 | D | 1280 | 970 | 480 | Performed | 7.0 | 650 | 60 | GA | 570 | Steel of present invention |
| D9 | D | 1270 | 970 | 380 | Performed | 7.0 | — | — | HR | — | Comparative steel |
| D10 | D | <u>1220</u> | 970 | 520 | Performed | 7.0 | 660 | 120 | GA | 560 | Comparative steel |
| D11 | D | 1290 | <u>830</u> | 390 | Performed | 7.0 | 680 | 120 | GA | 570 | Comparative steel |
| D12 | D | 1280 | 970 | <u>25</u> | Performed | 7.0 | 700 | 120 | GA | 570 | Comparative steel |
| D13 | D | 1260 | 960 | <u>680</u> | Performed | 7.0 | 690 | 480 | GA | 570 | Comparative steel |

The underlined numbers are outside of the range of the present invention.

TABLE 2-2

| Steel number | Kind of steel | Slab heating temperature (° C.) | Finish rolling temperature (° C.) | Coiling temperature (° C.) | Pickling | Rolling reduction under light reduction (%) | Heat treatment temperature (° C.) | Holding time (sec) | Plating and the like | Galvannealing temperature (° C.) | Note |
|---|---|---|---|---|---|---|---|---|---|---|---|
| D14 | D | 1270 | 970 | 430 | Performed | 7.0 | 650 | 40 | GA | 560 | Steel of present invention |
| D15 | D | 1280 | 970 | 450 | Performed | 8.0 | 630 | 60 | GA | 560 | Steel of present invention |
| D16 | D | 1270 | 970 | 450 | Performed | 7.0 | 660 | 100 | GA | 560 | Steel of present invention |
| D17 | D | 1270 | 960 | 490 | Performed | <u>0.0</u> | 640 | 120 | GA | 560 | Comparative steel |
| D18 | D | 1270 | 990 | 480 | Performed | 7.0 | <u>430</u> | 120 | GA | 570 | Comparative steel |
| D19 | D | 1290 | 990 | 480 | Performed | 6.0 | <u>770</u> | 120 | GA | 560 | Comparative steel |
| D20 | D | 1290 | 980 | 560 | Performed | 7.0 | 630 | <u>6</u> | GA | 560 | Comparative steel |
| D21 | D | 1290 | 960 | 460 | Performed | 6.0 | 680 | <u>2200</u> | GA | 590 | Comparative steel |
| D22 | D | 1270 | 990 | 450 | Performed | 7.0 | <u>820</u> | 120 | GA | 600 | Comparative steel |
| D23 | D | 1280 | 1020 | 420 | Performed | <u>50.0</u> | 650 | 360 | GA | 600 | Comparative steel |
| E1 | E | 1280 | 980 | 400 | Performed | 7.0 | 650 | 120 | GA | 560 | Steel of present invention |
| F1 | F | 1270 | 960 | 420 | Performed | 7.0 | 660 | 120 | GA | 550 | Steel of present invention |
| G1 | G | 1280 | 980 | 420 | Performed | 7.0 | 650 | 120 | GA | 540 | Steel of present invention |
| H1 | H | 1280 | 980 | 440 | Performed | 7.0 | 650 | 120 | GA | 560 | Steel of present invention |
| I1 | I | 1290 | 980 | 390 | Performed | 7.0 | 670 | 120 | GA | 560 | Steel of present invention |
| J1 | J | 1280 | 960 | 450 | Performed | 7.0 | 630 | 120 | GA | 570 | Steel of present invention |
| K1 | K | 1280 | 950 | 430 | Performed | 7.0 | 690 | 120 | GA | 550 | Steel of present invention |
| L1 | L | 1300 | 970 | 440 | Performed | 7.0 | 700 | 120 | GA | 560 | Steel of present invention |
| M1 | M | 1300 | 980 | 430 | Performed | 7.0 | 680 | 120 | GA | 550 | Steel of present invention |
| N1 | N | 1290 | 980 | 440 | Performed | 7.0 | 670 | 120 | GA | 560 | Steel of present invention |
| O1 | O | 1300 | 980 | 440 | Performed | 7.0 | 660 | 120 | HR | — | Steel of present invention |
| O2 | O | 1310 | 980 | 440 | Performed | 7.0 | 670 | 120 | GI | — | Steel of present invention |

TABLE 2-2-continued

| Steel number | Kind of steel | Slab heating temperature (° C.) | Finish rolling temperature (° C.) | Coiling temperature (° C.) | Pickling | Rolling reduction under light reduction (%) | Heat treatment temperature (° C.) | Holding time (sec) | Plating and the like | Galvannealing temperature (° C.) | Note |
|---|---|---|---|---|---|---|---|---|---|---|---|
| O3 | O | 1290 | 970 | 430 | Performed | 7.0 | <u>750</u> | 160 | GA | 560 | Comparative steel |
| O4 | O | 1300 | 980 | 430 | Performed | 7.0 | <u>640</u> | 120 | GA | 560 | Steel of present invention |
| O5 | O | 1300 | 960 | 450 | Performed | 6.0 | 640 | 120 | GA | 570 | Steel of present invention |
| O6 | O | 1310 | 960 | 390 | Performed | 9.0 | 630 | 80 | GA | 560 | Steel of present invention |
| O7 | O | 1290 | 960 | 390 | Performed | 7.0 | 680 | 160 | GA | 570 | Steel of present invention |
| O8 | O | 1290 | 980 | 420 | Performed | 7.0 | 670 | 40 | GA | 570 | Steel of present invention |
| O9 | O | 1290 | 980 | 430 | Performed | 7.0 | — | — | HR | — | Comparative steel |
| O10 | O | <u>1200</u> | 950 | 510 | Performed | 7.0 | 650 | 160 | GA | 560 | Comparative steel |
| O11 | O | <u>1290</u> | <u>840</u> | 460 | Performed | 7.0 | 670 | 160 | GA | 570 | Comparative steel |
| O12 | O | 1300 | <u>980</u> | <u>25</u> | Performed | 7.0 | 680 | 120 | GA | 570 | Comparative steel |
| O13 | O | 1310 | 1000 | <u>650</u> | Performed | 7.0 | 700 | 360 | GA | 570 | Comparative steel |
| P1 | P | 1320 | 970 | <u>390</u> | Performed | 6.0 | 670 | 120 | GA | 570 | Steel of present invention |
| a1 | a | 1260 | 960 | 420 | Performed | 7.0 | 650 | 120 | GA | 560 | Comparative steel |
| b1 | b | 1270 | 970 | 390 | Performed | 7.0 | 670 | 120 | GA | 580 | Comparative steel |
| c1 | c | 1250 | 960 | 460 | Performed | 7.0 | 650 | 120 | GA | 560 | Comparative steel |
| d1 | d | 1260 | 960 | 450 | Performed | 7.0 | 680 | 120 | GA | 580 | Comparative steel |
| e1 | e | 1260 | 980 | 480 | Performed | 7.0 | 660 | 120 | GA | 560 | Comparative steel |
| f1 | f | 1270 | 980 | 460 | Performed | 7.0 | 660 | 120 | GA | 570 | Comparative steel |

The underlined numbers are outside of the range of the present invention.

For the obtained hot-rolled steel sheet, microstructure observation, measurement of the number density of precipitate containing Ti and having an equivalent circle diameter of 5.0 nm or less, measurement of Hvs/Hvc, evaluation of tensile properties, evaluation of hole expansibility, and evaluation of the fatigue resistance were performed.

<Microstructure Observation>

Regarding the microstructure, the obtained hot-rolled steel sheet was cut out in parallel to the rolling direction, and polished and etched with a nital reagent, and the position with a thickness of ¼ from the surface in the sheet thickness direction is observed with the SEM at the magnification of 1.000 to 30,000 times. Accordingly, ferrite, bainite, pearlite, fresh martensite, and tempered martensite were identified, and an area ratio of the tempered martensite, the bainite, and other structures are obtained defined as the volume percentage.

<Measurement of Number Density of Precipitate Containing Ti and Having Equivalent Circle Diameter of 5.0 nm or Less>

For the number density of the precipitate containing Ti, the number density of the precipitate included per unit volume of the steel sheet for each equivalent circle diameter at 1 nm pitch was measured, by using the electrolytic extraction residual method with respect to the sample collected from the ¼ position from the surface. In this case, composition analysis of a carbide was performed with a transmission electron microscope (TEM) and an EDS, and it was confirmed that fine precipitate was the precipitate containing Ti.

<Measurement of Hvs/Hvc>

For the average hardness Hvs at the position of a depth of 20 μm from the surface, a sample was cut out from the ¼ position in the width direction of the steel sheet so that a cross section parallel to the rolling direction was a measurement surface, embedding polishing was performed, a Vickers hardness at the position of 20 μm from the surface was measured at 10 points with a load of 10 gf based on JIS Z 2244: 2009, and an average value thereof was set to Hvs. For the Hvc, a sample was cut out from the ¼ position in the width direction of the steel sheet so that a cross section parallel to the rolling direction was a measurement surface, embedding polishing was performed, a Vickers hardness at a pitch of about 0.05 mm in the sheet thickness direction from the position of 0.20 to 0.50 mm from the surface was measured at 7 points with a load of 10 gf based on JIS Z 2244:2009, and an average value thereof was set to Hvc. Hvs/Hvc was obtained from these Hvs and Hvc.

<Evaluation of Tensile Properties>

The tensile properties (YP, TS, and El) were obtained by a tensile test performed based on JIS Z 2241:2011 using JIS No. 5 test piece cut out in the direction perpendicular to the rolling direction. In a case where the tensile strength was 980 MPa or more and the product of strength and elongation (TS×El) was 12,000 MPa×% or more, it was determined that the strength and ductility were excellent. In addition, in a case where YP/TS was 0.90 or more, it was determined that the proof stress was high.

<Evaluation of Hole Expansibility>

The hole expansion ratio was determined by a hole expansion test method based on JIS Z 2256:2010. Specifically, the test piece was cut out from a ¼ width position in the width direction of the steel sheet, and punched using a punch having a diameter of 10 mm and a die having an inner diameter of 10.6 mm, a burr of the punched part was set to on the opposite side of the punch using a 60° Conical punch, hole expansion was performed, the test was stopped at the timing when crack generated on the punched part penetrates the sheet thickness, and the hole diameter after the hole expansion test was measured to obtain the hole expansion ratio. In a case where the hole expansion ratio is 40% or more, it is determined that the hole expansibility is excellent. In a case where the hole expansion ratio is 40% or more, it is suitable for undercarriage compartments having a burring portion and a stretch flange portion.

<Evaluation of Fatigue Resistance>

The fatigue resistance was measured and evaluated by a plane bending fatigue test at stress ratio, R=−1 described in JIS Z 2275:1978. Specifically, after obtaining a relationship between the applied stress and the number of repetitions, the stress without fracture, even in a case where the stress is repeatedly applied $10^7$ times, was defined as a fatigue limit (FS), and the fatigue resistance was adjusted with a value obtained by dividing the fatigue limit by TS. In a case where this value exceeds 0.40, it was determined that fatigue resistance is excellent.

The results are shown in Tables 3-1 to 3-3.

TABLE 3-1

| Steel number | Kind of steel | Microstructure volume percentage (%) | | | | Number density of precipitate having equivalent circle diameter of 5.0 nm or less (pieces/mm³) | Hvs/Hvc |
|---|---|---|---|---|---|---|---|
| | | Tempered martensite | Bainite | Total | Other structure | | |
| A1 | GA | 42 | 58 | 100 | — | 2.6 × 10¹⁰ | 0.89 |
| B1 | HR | 16 | 84 | 100 | — | 2.5 × 10¹⁰ | 0.88 |
| B2 | GI | 13 | 87 | 100 | — | 1.6 × 10¹⁰ | 0.89 |
| B3 | GA | 17 | 83 | 100 | — | __3.8 × 10⁹__ | __0.84__ |
| B4 | GA | 22 | 78 | 100 | — | 2.8 × 10¹⁰ | 0.89 |
| B5 | GA | 50 | 50 | 100 | — | 2.1 × 10¹⁰ | 0.88 |
| B6 | GA | 34 | 66 | 100 | — | 6.9 × 10¹⁰ | 0.87 |
| B7 | GA | 28 | 72 | 100 | — | 2.7 × 10¹⁰ | 0.88 |
| B8 | GA | 26 | 74 | 100 | — | 5.6 × 10¹⁰ | 0.90 |
| B9 | GA | 53 | 47 | 100 | — | __4.1 × 10⁹__ | __0.81__ |
| B10 | GA | 36 | 64 | 100 | — | __3.6 × 10⁹__ | __0.84__ |
| B11 | GA | 28 | 72 | 100 | — | __4.1 × 10⁹__ | __0.83__ |
| B12 | GA | 100 | 0 | 100 | — | __5.9 × 10¹¹__ | __0.92__ |
| B13 | GA | 0 | 18 | __18__ | Ferrite, pearlite | __1.6 × 10⁹__ | __0.83__ |
| B14 | GA | 28 | 72 | 100 | — | 3.2 × 10¹⁰ | __0.91__ |
| B15 | GA | 19 | 81 | 100 | — | 2.6 × 10¹⁰ | 0.89 |
| B16 | GA | 28 | 72 | 100 | — | 1.3 × 10¹⁰ | 0.90 |
| B17 | GA | 16 | 84 | 100 | — | __2.9 × 10⁹__ | __0.77__ |
| B18 | GA | 22 | 78 | 100 | — | __4.1 × 10⁹__ | __0.79__ |
| B19 | GA | 16 | 84 | 100 | — | __4.1 × 10⁹__ | __0.83__ |
| B20 | GA | 17 | 83 | 100 | — | __2.8 × 10⁹__ | __0.84__ |
| B21 | GA | 36 | 64 | 100 | — | __3.9 × 10⁹__ | __0.84__ |
| B22 | GA | 13 | 87 | 100 | — | __2.7 × 10⁹__ | __0.82__ |
| B23 | GA | 22 | 56 | __78__ | Ferrite | __2.2 × 10⁹__ | __0.81__ |
| B24 | GA | 6 | 33 | __39__ | Ferrite (recrystallization) | 2.2 × 10¹⁰ | __0.74__ |
| B25 | GA | 26 | 70 | __96__ | Ferrite | 5.7 × 10⁹ | 0.88 |
| C1 | GA | 17 | 83 | 100 | — | 4.1 × 10¹⁰ | 0.89 |

| Steel number | Tensile properties | | | | | Hole expansion ratio (%) | Fatigue limit ratio | Note |
|---|---|---|---|---|---|---|---|---|
| | YP (MPa) | TS (MPa) | Yield ratio | EI (%) | TS × EI (MPa × %) | | | |
| A1 | 992 | 1053 | 0.94 | 14 | 14742 | 81 | 0.46 | Steel of present invention |
| B1 | 964 | 1018 | 0.95 | 15 | 15270 | 76 | 0.45 | Steel of present invention |
| B2 | 956 | 1006 | 0.95 | 15 | 15090 | 85 | 0.44 | Steel of present invention |
| B3 | 842 | __923__ | 0.91 | 15 | 13845 | 32 | 0.37 | Comparative steel |
| B4 | 979 | __1023__ | 0.96 | 15 | 15345 | 82 | 0.44 | Steel of present invention |
| B5 | 950 | 994 | 0.96 | 15 | 14910 | 78 | 0.42 | Steel of present invention |
| B6 | 982 | 1049 | 0.94 | 14 | 14686 | 76 | 0.45 | Steel of present invention |
| B7 | 905 | 982 | 0.92 | 15 | 14730 | 80 | 0.47 | Steel of present invention |
| B8 | 1007 | 1056 | 0.95 | 14 | 14784 | 75 | 0.45 | Steel of present invention |
| B9 | 642 | __854__ | 0.75 | 6 | __5124__ | 62 | 0.38 | Comparative steel |
| B10 | 810 | __903__ | 0.90 | 15 | __13545__ | 83 | 0.44 | Comparative steel |
| B11 | 824 | __943__ | 0.87 | 15 | 14145 | 80 | 0.43 | Comparative steel |
| B12 | 879 | __1043__ | 0.84 | 11 | 11473 | 62 | 0.47 | Comparative steel |
| B13 | 567 | __741__ | 0.77 | 18 | __13338__ | 79 | 0.42 | Comparative steel |
| B14 | 970 | __1022__ | 0.95 | 15 | 15330 | 82 | 0.46 | Steel of present invention |
| B15 | 964 | 1019 | 0.95 | 15 | 15285 | 83 | 0.47 | Steel of present invention |
| B16 | 956 | 992 | 0.96 | 14 | 13888 | 81 | 0.48 | Steel of present invention |
| B17 | 822 | __953__ | 0.86 | 15 | 14295 | 79 | 0.38 | Comparative steel |
| B18 | 832 | __968__ | 0.86 | 15 | 14520 | 80 | 0.39 | Comparative steel |

TABLE 3-1-continued

| | | | | | | | | |
|---|---|---|---|---|---|---|---|---|
| B19 | 726 | 892 | 0.81 | 8 | 7136 | 64 | 0.37 | Comparative steel |
| B20 | 762 | 842 | 0.90 | 16 | 13472 | 35 | 0.36 | Comparative steel |
| B21 | 742 | 906 | 0.82 | 9 | 8154 | 71 | 0.38 | Comparative steel |
| B22 | 872 | 968 | 0.90 | 14 | 13552 | 89 | 0.45 | Comparative steel |
| B23 | 762 | 916 | 0.83 | 15 | 13740 | 31 | 0.39 | Comparative steel |
| B24 | 616 | 842 | 0.73 | 16 | 13472 | 46 | 0.35 | Comparative steel |
| B25 | 902 | 992 | 0.91 | 15 | 14880 | 66 | 0.41 | Steel of present invention |
| C1 | 980 | 1034 | 0.95 | 14 | 14476 | 82 | 0.46 | Steel of present invention |

TABLE 3-2

| Steel number | Kind of steel | Microstructure volume percentage (%) | | | | Number density of precipitate having equivalent circle diameter of 5.0 nm or less (pieces/mm$^3$) | Hvs/Hvc |
|---|---|---|---|---|---|---|---|
| | | Tempered martensite | Bainite | Total | Other structure | | |
| D1 | HR | 35 | 65 | 100 | — | $2.9 \times 10^{10}$ | 0.92 |
| D2 | GI | 25 | 75 | 100 | — | $3.3 \times 10^{10}$ | 0.91 |
| D3 | GA | 26 | 74 | 100 | — | $2.4 \times 10^{9}$ | 0.84 |
| D4 | GA | 43 | 57 | 100 | — | $3.7 \times 10^{10}$ | 0.91 |
| D5 | GA | 14 | 86 | 100 | — | $1.6 \times 10^{10}$ | 0.89 |
| D6 | GA | 35 | 65 | 100 | — | $6.9 \times 10^{10}$ | 0.90 |
| D7 | GA | 13 | 87 | 100 | — | $2.6 \times 10^{10}$ | 0.92 |
| D8 | GA | 14 | 86 | 100 | — | $2.8 \times 10^{10}$ | 0.91 |
| D9 | GA | 49 | 51 | 100 | — | $4.3 \times 10^{9}$ | 0.82 |
| D10 | GA | 13 | 87 | 100 | — | $3.7 \times 10^{9}$ | 0.83 |
| D11 | GA | 46 | 54 | 100 | — | $3.9 \times 10^{9}$ | 0.84 |
| D12 | GA | 100 | 0 | 100 | — | $5.6 \times 10^{11}$ | 0.94 |
| D13 | GA | 0 | 13 | 13 | Ferrite, pearlite | $2.8 \times 10^{9}$ | 0.79 |
| D14 | GA | 35 | 65 | 100 | — | $3.3 \times 10^{10}$ | 0.91 |
| D15 | GA | 14 | 86 | 100 | — | $4.9 \times 10^{10}$ | 0.89 |
| D16 | GA | 15 | 85 | 100 | — | $3.5 \times 10^{10}$ | 0.88 |
| D17 | GA | 13 | 87 | 100 | — | $4.0 \times 10^{9}$ | 0.80 |
| D18 | GA | 15 | 85 | 100 | — | $4.5 \times 10^{9}$ | 0.83 |
| D19 | GA | 13 | 87 | 100 | — | $2.6 \times 10^{9}$ | 0.84 |
| D20 | GA | 14 | 86 | 100 | — | $3.8 \times 10^{9}$ | 0.81 |
| D21 | GA | 13 | 87 | 100 | — | $2.2 \times 10^{9}$ | 0.79 |
| D22 | GA | 19 | 81 | 100 | — | $2.6 \times 10^{9}$ | 0.82 |
| D23 | GA | 7 | 42 | 49 | Ferrite (recrystallization) | $1.9 \times 10^{10}$ | 0.73 |
| E1 | GA | 46 | 54 | 100 | — | $5.6 \times 10^{10}$ | 0.91 |
| F1 | GA | 29 | 71 | 100 | — | $3.8 \times 10^{10}$ | 0.90 |
| G1 | GA | 37 | 63 | 100 | — | $3.9 \times 10^{10}$ | 0.92 |
| H1 | GA | 26 | 74 | 100 | — | $4.3 \times 10^{10}$ | 0.91 |

| Steel number | Tensile properties | | | | Hole expansion ratio (%) | Fatigue limit ratio | Note |
|---|---|---|---|---|---|---|---|
| | YP (MPa) | TS (MPa) | Yield ratio | EI (%) | TS × EI (MPa × %) | | |
| D1 | 974 | 1038 | 0.94 | 15 | 15570 | 83 | 0.48 | Steel of present invention |
| D2 | 969 | 1034 | 0.94 | 14 | 14476 | 78 | 0.47 | Steel of present invention |
| D3 | 912 | 937 | 0.97 | 14 | 13118 | 29 | 0.38 | Comparative steel |
| D4 | 982 | 1033 | 0.95 | 14 | 14462 | 85 | 0.46 | Steel of present invention |
| D5 | 956 | 1010 | 0.95 | 16 | 16160 | 78 | 0.45 | Steel of present invention |
| D6 | 988 | 1054 | 0.94 | 14 | 14756 | 82 | 0.47 | Steel of present invention |
| D7 | 982 | 1035 | 0.95 | 15 | 15525 | 84 | 0.48 | Steel of present invention |
| D8 | 991 | 1037 | 0.96 | 15 | 15555 | 80 | 0.47 | Steel of present invention |
| D9 | 673 | 876 | 0.77 | 5 | 4380 | 62 | 0.37 | Comparative steel |
| D10 | 832 | 910 | 0.91 | 15 | 13650 | 76 | 0.42 | Comparative steel |
| D11 | 816 | 937 | 0.87 | 15 | 14055 | 78 | 0.43 | Comparative steel |
| D12 | 991 | 1068 | 0.93 | 11 | 11748 | 80 | 0.48 | Comparative steel |
| D13 | 682 | 786 | 0.87 | 18 | 14148 | 76 | 0.43 | Comparative steel |
| D14 | 986 | 1039 | 0.95 | 14 | 14546 | 83 | 0.46 | Steel of present invention |

TABLE 3-2-continued

| | | | | | | | | |
|---|---|---|---|---|---|---|---|---|
| D15 | 977 | 1035 | 0.94 | 14 | 14490 | 84 | 0.45 | Steel of present invention |
| D16 | 980 | 1037 | 0.95 | 13 | 13481 | 81 | 0.47 | Steel of present invention |
| D17 | 812 | 967 | 0.84 | 14 | 13538 | 86 | 0.37 | Comparative steel |
| D18 | 726 | 909 | 0.80 | 7 | 6363 | 59 | 0.38 | Comparative steel |
| D19 | 762 | 868 | 0.88 | 16 | 13888 | 32 | 0.36 | Comparative steel |
| D20 | 829 | 1052 | 0.79 | 8 | 8416 | 68 | 0.44 | Comparative steel |
| D21 | 862 | 958 | 0.90 | 14 | 13412 | 73 | 0.46 | Comparative steel |
| D22 | 749 | 938 | 0.80 | 13 | 12194 | 29 | 0.42 | Comparative steel |
| D23 | 598 | 864 | 0.69 | 16 | 13824 | 46 | 0.38 | Comparative steel |
| E1 | 954 | 1016 | 0.94 | 15 | 15240 | 78 | 0.47 | Steel of present invention |
| F1 | 964 | 1027 | 0.94 | 14 | 14378 | 80 | 0.48 | Steel of present invention |
| G1 | 970 | 1033 | 0.94 | 14 | 14462 | 83 | 0.45 | Steel of present invention |
| H1 | 955 | 1028 | 0.93 | 14 | 14392 | 79 | 0.47 | Steel of present invention |

TABLE 3-3

| Steel number | Kind of steel | Microstructure volume percentage (%) | | | | Number density of precipitate having equivalent circle diameter of 5.0 nm or less (pieces/mm$^3$) | Hvs/Hvc |
|---|---|---|---|---|---|---|---|
| | | Tempered martensite | Bainite | Total | Other structure | | |
| I1 | GA | 45 | 55 | 100 | — | $5.1 \times 10^{10}$ | 0.92 |
| J1 | GA | 11 | 89 | 100 | — | $5.6 \times 10^{10}$ | 0.90 |
| K1 | GA | 32 | 68 | 100 | — | $5.6 \times 10^{10}$ | 0.89 |
| L1 | GA | 15 | 85 | 100 | — | $4.3 \times 10^{10}$ | 0.91 |
| M1 | GA | 16 | 84 | 100 | — | $5.1 \times 10^{10}$ | 0.90 |
| N1 | GA | 17 | 83 | 100 | — | $3.7 \times 10^{10}$ | 0.91 |
| O1 | HR | 13 | 87 | 100 | — | $6.8 \times 10^{11}$ | 0.92 |
| O2 | GI | 12 | 88 | 100 | — | $5.5 \times 10^{11}$ | 0.92 |
| O3 | GA | 21 | 79 | 100 | — | $4.3 \times 10^{9}$ | 0.84 |
| O4 | GA | 22 | 78 | 100 | — | $5.6 \times 10^{11}$ | 0.90 |
| O5 | GA | 6 | 94 | 100 | — | $5.2 \times 10^{11}$ | 0.92 |
| O6 | GA | 46 | 54 | 100 | — | $6.3 \times 10^{11}$ | 0.91 |
| O7 | GA | 48 | 52 | 100 | — | $5.3 \times 10^{11}$ | 0.92 |
| O8 | GA | 29 | 71 | 100 | — | $5.5 \times 10^{11}$ | 0.91 |
| O9 | GA | 22 | 78 | 100 | — | $3.8 \times 10^{9}$ | 0.83 |
| O10 | GA | 13 | 87 | 100 | — | $4.3 \times 10^{9}$ | 0.84 |
| O11 | GA | 9 | 91 | 100 | — | $4.8 \times 10^{9}$ | 0.83 |
| O12 | GA | 100 | 0 | 100 | — | $6.7 \times 10^{11}$ | 0.94 |
| O13 | GA | 0 | 9 | 9 | Ferrite, pearlite | $3.6 \times 10^{9}$ | 0.79 |
| P1 | GA | 46 | 54 | 100 | — | $5.9 \times 10^{11}$ | 0.92 |
| a1 | GA | 0 | 39 | 39 | Ferrite | $3.4 \times 10^{9}$ | 0.78 |
| b1 | GA | 29 | 71 | 100 | — | $2.4 \times 10^{9}$ | 0.76 |
| c1 | GA | 0 | 33 | 33 | Ferrite, pearlite | $8.4 \times 10^{8}$ | 0.75 |
| d1 | GA | 12 | 88 | 100 | — | 0 | 0.77 |
| e1 | GA | 13 | 87 | 100 | — | $2.2 \times 10^{8}$ | 0.74 |
| f1 | GA | 6 | 94 | 100 | — | $1.9 \times 10^{9}$ | 0.76 |

| Steel number | Tensile properties | | | | Hole expansion ratio (%) | Fatigue limit ratio | Note |
|---|---|---|---|---|---|---|---|
| | YP (MPa) | TS (MPa) | Yield ratio | EI (%) | TS × EI (MPa × %) | | |
| I1 | 963 | 1032 | 0.93 | 15 | 15480 | 81 | 0.46 | Steel of present invention |
| J1 | 960 | 1032 | 0.93 | 15 | 15480 | 80 | 0.46 | Steel of present invention |
| K1 | 958 | 1024 | 0.94 | 14 | 14336 | 83 | 0.45 | Steel of present invention |
| L1 | 961 | 1019 | 0.94 | 16 | 16304 | 82 | 0.47 | Steel of present invention |
| M1 | 963 | 1028 | 0.94 | 14 | 14392 | 78 | 0.48 | Steel of present invention |
| N1 | 940 | 1009 | 0.93 | 15 | 15135 | 77 | 0.46 | Steel of present invention |

TABLE 3-3-continued

| | | | | | | | | |
|---|---|---|---|---|---|---|---|---|
| O1 | 1166 | 1196 | 0.97 | 12 | 14352 | 52 | 0.45 | Steel of present invention |
| O2 | 1182 | 1201 | 0.98 | 13 | 15613 | 54 | 0.46 | Steel of present invention |
| O3 | 842 | 945 | 0.89 | 15 | 14175 | 19 | 0.38 | Comparative steel |
| O4 | 1161 | 1196 | 0.97 | 12 | 14352 | 56 | 0.46 | Steel of present invention |
| O5 | 1139 | 1186 | 0.96 | 13 | 15418 | 60 | 0.47 | Steel of present invention |
| O6 | 1179 | 1223 | 0.96 | 12 | 14676 | 54 | 0.45 | Steel of present invention |
| O7 | 1164 | 1202 | 0.97 | 12 | 14424 | 58 | 0.46 | Steel of present invention |
| O8 | 1176 | 1208 | 0.97 | 12 | 14496 | 55 | 0.46 | Steel of present invention |
| O9 | 672 | 862 | 0.78 | 4 | 3448 | 43 | 0.39 | Comparative steel |
| O10 | 842 | 962 | 0.88 | 14 | 13468 | 51 | 0.43 | Comparative steel |
| O11 | 853 | 971 | 0.88 | 14 | 13594 | 48 | 0.42 | Comparative steel |
| O12 | 1156 | 1209 | 0.96 | 9 | 10881 | 55 | 0.48 | Comparative steel |
| O13 | 745 | 854 | 0.87 | 17 | 14518 | 59 | 0.42 | Comparative steel |
| P1 | 1176 | 1216 | 0.97 | 12 | 14592 | 52 | 0.46 | Steel of present invention |
| a1 | 642 | 756 | 0.85 | 22 | 16632 | 72 | 0.39 | Comparative steel |
| b1 | 763 | 896 | 0.85 | 17 | 15232 | 56 | 0.38 | Comparative steel |
| c1 | 682 | 786 | 0.87 | 19 | 14934 | 56 | 0.38 | Comparative steel |
| d1 | 576 | 675 | 0.85 | 27 | 18225 | 63 | 0.36 | Comparative steel |
| e1 | 613 | 721 | 0.85 | 24 | 17304 | 70 | 0.37 | Comparative steel |
| f1 | 598 | 689 | 0.87 | 26 | 17914 | 65 | 0.36 | Comparative steel |

As can be seen from Tables 1 to 3-3, in the example (steel of the present invention) having the chemical composition of the present invention and satisfying the hot rolling conditions, the rolling reduction, and the heat treatment conditions of the present invention, the number density of the precipitate containing Ti and having an equivalent circle diameter of 5.0 nm or less was $5.0 \times 10^9$ pieces/mm$^3$ or more. In addition, in these examples, a tensile strength of 980 MPa or more, a high yield ratio of 0.90 or more, TS×El of 12,000 MPa×% or more, and excellent fatigue resistance were achieved.

In contrast, in comparative examples in which any one or more of the chemical composition, the slab heating temperature, the finish temperature, the coiling temperature, the light reduction conditions, and the heat treatment conditions are outside of the range of the present invention, the microstructure of the steel sheet, Hvs/Hvc, and the number density or the tensile strength of the precipitate containing Ti and having an equivalent circle diameter of 5.0 nm or less was low. As a result, tensile strength of 980 MPa or more, high proof stress of YP/TS≥0.90, high ductility of TS×El≥12,000 MPa×%, and excellent fatigue resistance of fatigue limit/TS≥0.40 or more could not be obtained at the same time.

INDUSTRIAL APPLICABILITY

According to the present invention, it is possible to provide a high-strength steel sheet having a tensile strength of 980 MPa or more, which has high proof stress, high ductility, and excellent fatigue resistance. This steel sheet has great industrial value, because it contributes to weight reduction of vehicle components. In addition, this steel sheet is suitable for undercarriage compartments of vehicles, since it has high strength (high tensile strength), high proof stress, high ductility, and excellent fatigue resistance.

What is claimed is:
1. A high-strength steel sheet, comprising,
as a chemical composition, by mass %:
  C: 0.020 to 0.090%;
  Si: 0.01 to 2.00%;
  Mn: 1.00 to 3.00%;
  Ti: 0.010 to 0.200%;
  Al: 0.005 to 1.000%;
  P: 0.100% or less;
  S: 0.0100% or less;
  N: 0.0100% or less;
  Ni: 0 to 2.00%;
  Cu: 0 to 2.00%;
  Cr: 0 to 2.00%;
  Mo: 0 to 2.00%;
  Nb: 0 to 0.100%;
  V: 0 to 0.100%;
  W: 0 to 0.100%;
  B: 0 to 0.0100%;
  REM: 0 to 0.0300%;
  Ca: 0 to 0.0300%;
  Mg: 0 to 0.0300%; and
  a remainder of Fe and impurities,
  wherein 0.100≤Ti+Nb+V≤0.450 is satisfied,
  a microstructure contains, by volume percentage, 95% or more of tempered martensite and bainite in total, and a remainder consists of ferrite and pearlite,
  the microstructure contains $5.2 \times 10^{11}$ pieces/mm$^3$ or more of, per unit volume, precipitate having an equivalent circle diameter of 5.0 nm or less and containing Ti,
  Hvs/Hvc which is a ratio of an average hardness Hvs at a position of a depth of 20 μm from a surface to an average hardness Hvc at a position of 0.20 to 0.50 mm from the surface is 0.85 or more,
  a tensile strength is 1186 MPa or more,
  a yield ratio is 0.96 or more, and
  a product of the tensile strength and elongation is 12,000 MPa×% or more.
2. The high-strength steel sheet according to claim 1, comprising:
as the chemical composition, by mass %, at least one of:
  Ni: 0.01 to 2.00%;
  Cu: 0.01 to 2.00%;
  Cr: 0.01 to 2.00%;

Mo: 0.01 to 2.00%;
Nb: 0.005 to 0.100%;
V: 0.005 to 0.100%;
W: 0.005 to 0.100%;
B: 0.0005 to 0.0100%;
REM: 0.0003 to 0.0300%;
Ca: 0.0003 to 0.0300%; and
Mg: 0.0003 to 0.0300%.

3. The high-strength steel sheet according to claim 1 further comprising a hot-dip galvanized layer on the surface.

4. The high-strength steel sheet according to claim 3, wherein the hot-dip galvanized layer is a hot-dip galvannealed layer.

5. The high-strength steel sheet according to claim 2, further comprising a hot-dip galvanized layer on the surface.

6. A method for manufacturing the high-strength steel sheet according to claim 1, the method comprising:
a heating step of heating a slab including, as a chemical composition, by mass %: C: 0.020 to 0.090%; Si: 0.01 to 2.00%; Mn: 1.00 to 3.00%; Ti: 0.010 to 0.200%; Al: 0.005 to 1.000%; P: 0.100% or less; S: 0.0100% or less; N: 0.0100% or less; Ni: 0 to 2.00%; Cu: 0 to 2.00%; Cr: 0 to 2.00%; Mo: 0 to 2.00%; Nb: 0 to 0.100%; V: 0 to 0.100%; W: 0 to 0.100%; B: 0 to 0.0100%; REM: 0 to 0.0300%; Ca: 0 to 0.0300%; Mg: 0 to 0.0300%; and a remainder of Fe and impurities, to 1,230° C. or higher;
a hot rolling step of performing hot rolling with respect to the slab such that a finish rolling temperature is 930° C. or higher to obtain a hot-rolled steel sheet;
a coiling step of coiling the hot-rolled steel sheet at 300° C. or higher and 600° C. or lower and then cooling the hot-rolled steel sheet to room temperature;
a pickling step of pickling the hot-rolled steel sheet after the coiling step;
a light reduction step of performing light reduction with respect to the hot-rolled steel sheet after the pickling step at rolling reduction higher than 5% and 30% or less; and
a reheating step of reheating the hot-rolled steel sheet after the light reduction step in a temperature range of 450° C. to Ac1° C. and holding for 10 to 1,500 seconds.

7. The method for manufacturing a high-strength steel sheet according to claim 6, further comprising a plating step of hot-dip galvanizing the hot-rolled steel sheet after the reheating step.

8. The method for manufacturing a high-strength steel sheet according to claim 7 further comprising performing a galvannealing step of galvannealing by heating the bot-rolled steel sheet after the hot-dip galvanizing step to 460° C. to 600° C.

9. A high-strength steel sheet, comprising,
as a chemical composition, by mass %:
C: 0.020 to 0.090%;
Si: 0.01 to 2.00%;
Mn: 1.00 to 3.00%;
Ti: 0.010 to 0.200%;
Al: 0.005 to 1.000%;
P: 0.100% or less;
S: 0.0100% or less;
N: 0.0100% or less;
Ni: 0 to 2.00%;
Cu: 0 to 2.00%;
Cr: 0 to 2.00%;
Mo: 0 to 2.00%;
Nb: 0 to 0.100%;
V: 0 to 0.100%;
W: 0 to 0.100%;
B: 0 to 0.0100%;
REM: 0 to 0.0300%;
Ca: 0 to 0.0300%;
Mg: 0 to 0.0300%; and
a remainder of Fe and impurities,
wherein $0.100 \leq Ti+Nb+V \leq 0.450$ is satisfied,
a microstructure contains, by volume percentage, 95% or more of tempered martensite and bainite in total, and a remainder comprises ferrite and pearlite,
the microstructure contains $5.2 \times 10^{11}$ pieces/mm$^3$ or more of, per unit volume, precipitate having an equivalent circle diameter of 5.0 nm or less and containing Ti,
Hvs/Hvc which is a ratio of an average hardness Hvs at a position of a depth of 20 μm from a surface to an average hardness Hvc at a position of 0.20 to 0.50 mm from the surface is 0.85 or more,
a tensile strength is 1186 MPa or more,
a yield ratio is 0.96 or more, and
a product of the tensile strength and elongation is 12,000 MPa×% or more.

* * * * *